United States Patent
Wang et al.

(10) Patent No.: US 7,105,633 B2
(45) Date of Patent: Sep. 12, 2006

(54) SOLUBLE POLY(ARYL-OXADIAZOLE) CONJUGATED POLYMERS

(75) Inventors: Hailiang Wang, Camarillo, CA (US); Gang Yu, Santa Barbara, CA (US); Gordana Srdanov, Santa Barbara, CA (US)

(73) Assignee: E. I. Du Pont de Nemours and Company, Wilmington, DE (US)

( * ) Notice: Subject to any disclaimer, the term of this patent is extended or adjusted under 35 U.S.C. 154(b) by 58 days.

(21) Appl. No.: 11/028,740

(22) Filed: Jan. 4, 2005

(65) Prior Publication Data

US 2005/0156516 A1 Jul. 21, 2005

Related U.S. Application Data

(60) Division of application No. 10/176,473, filed on Jun. 20, 2002, now Pat. No. 6,864,352, which is a continuation-in-part of application No. 09/546,512, filed on Apr. 11, 2000, now abandoned.

(51) Int. Cl.
C08F 6/66 (2006.01)
C08G 73/66 (2006.01)

(52) U.S. Cl. .................. 528/491; 528/497; 528/502 A; 528/502 R; 528/423; 528/425; 528/274; 428/690; 428/917; 427/66; 427/374.4

(58) Field of Classification Search .............. 528/491, 528/497, 502 A, 502 R, 423, 425, 274; 428/690, 428/917; 427/66, 374.4
See application file for complete search history.

(56) References Cited

U.S. PATENT DOCUMENTS

| 3,238,163 | A | 3/1966 | Frazer |
|---|---|---|---|
| 3,376,267 | A | 4/1968 | Pruckmayr |
| 5,331,183 | A | 7/1994 | Sariciftci et al. |
| 5,454,880 | A | 10/1995 | Sariciftci et al. |
| 5,470,505 | A | 11/1995 | Smith et al. |
| 5,597,925 | A | 1/1997 | Ohta et al. |
| 5,656,401 | A | 8/1997 | Ohta et al. |
| 5,723,873 | A | 3/1998 | Yang |
| 5,869,350 | A | 2/1999 | Heeger et al. |
| 5,965,281 | A | 10/1999 | Cao |

FOREIGN PATENT DOCUMENTS

DE 3620022 A1 12/1987

(Continued)

OTHER PUBLICATIONS

Yin et al, Heterocycle-substituted poly(m-phenylene vinylana) for lighting emitting devices, 1998, Kexus Chubanahe, Chem. Abstract 129:5137.

(Continued)

*Primary Examiner*—Duc Truong

(57) ABSTRACT

This invention discloses a class of soluble poly(arylene-oxadiazole) polymers and copolymers comprising at least 20 repeat units, which may be the same or different, represented by the formula:

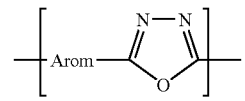

wherein Arom can be a fluorene group, an aromatic hydrocarbon ring, an aromatic $C_{2+}$ heterocyclic ring, or two aromatic rings linked by a single bond, ethenyl bond, or ethynyl bond. A process for preparing the polymers and copolymers by reacting dicarboxylic acids and hydrazine salt is provided. The polymers are useful in electroluminescent devices, photovoltaic cells, and diodes.

8 Claims, 11 Drawing Sheets

FOREIGN PATENT DOCUMENTS

| | | | |
|---|---|---|---|
| EP | 0622975 A1 | 11/1994 | |
| EP | 0544795 | 4/1999 | |
| WO | WO 98/04610 | 2/1998 | |
| WO | WO 98/27136 | 6/1998 | |
| WO | WO 98/57381 | 12/1998 | |
| WO | WO 0014144 | 3/2000 | |
| WO | WO 00/22663 | 4/2000 | |

OTHER PUBLICATIONS

Yin et al., Heterocycle-substituted poly(p-phonylena vinylene) for ligh emitting devices. 1996, Elsevier Science S.A., Chem. Abstract 128:314788.

Hwang et al., Synthesis and characterization of new poly(aryl ethar)s—chromophores, 2000, Elsevier Science Ltd., Chem. Abstract, 133:135681.

Yu. G. et al., Dual-function semiconducting polymer devices: Light-emitting and photodecting diodes, Appl. Phys. Lett, 64(12):1540-1542, Mar. 21, 1994.

Diaz-Garcia, Maria A. et al., "Plastic" leaars: Comparison of gain narrowing with a soluble semiconducting polymer in waveguides and mircoavities, Appl. Phys. Lett. 70(24):3191-3193, Jun. 16, 1997.

Burroughes, J.H. et al., Light-emitting diodes based on conjugated polymers. Nature, 347:539-541, Oct. 11, 1990.

Parker, I.D. et al., Lifetime and degradation effects in polymer light-emitting diodes, Journal of Applied Physics, 85(4):2441-2447, Feb. 15, 1999.

Braun, D. et al., Electroluminescence and electrical transport in poly(3-octylthlophena)diodes, J. Appl. Phys. 72(8):564-568, Jul. 15, 1992.

Becker, Heinrich et al., Soluble PPVs with Enhanced Performances—A Mechanlstic Approach, Advanced Materials, 12(1)42-48, 2000.

Adachi. Chihaya et al, Confinement of charge carriers and molecular excitons within 5-nm-thick emitter layer in organic electroluminescent devices with a double heterostructure, Appl. Phys. Lett. 57(8):531-533, Aug. 6, 1990.

Adachi, Chihaya et al., Blue light-emitting organic electroluminescent devices, Appl. Phys. Lett. 56(9):799-801, Feb. 26, 1990.

Pei Q. et al., 1,3,4-Oxandiazole-Containing Polymers as Electron-injection and Blue Electroluminescent Materials In Polymer Light-Emitting Diodes, Chem. Mater., 7:1568-1575, 1995.

Peng. Zhonghus et al., Oxadiazole-Containing Conjugated Polymers for Light-Emitting Diodes, Advanced Materials, 10(9):680-684, 1998.

Schulz. B. et al., New Aromatic Poly(1,3,4-oxadiazole)s for Light Emitting Diodes, Synthetic Metals, 64:449-450, 1997.

Bao, Zhenan et al., Novel Oxadiazole Side Chain Conjugated Polymers as Single-Layer Light-Emitting Diodes with Improved Quantum Efficiencies, Chemistry of Materials, 10(5):1201-1204, May 1998.

Roncali, Jean, Synthetic Principles for Bandgap Control in Linear—Conjugated Systems, Chem. Rev. 97:173-205, 1997.

Braun, D. et al., Visible light emission from semiconducting polymer diodes, Appl. Phys. Lett., 58(18):1982-1984, May 6, 1991.

Parker, I.D., Carrier tunnelling and device characteristics in polymer light-emitting diodes, J. Appl. Phys. 75(3):1656-1666, Feb. 1, 1994.

Yu, Gang, High performance phototonic devices made with semiconducting polymers, Synthetic Metals, 80:143-150, 1996.

Gustafsson, G. et al., Flexible light-emitting diodes made from soluble conducting polymers, Nature, 957:477-479, Jun. 11, 1992.

Gao, J. et al., Soluble polypyrrole as the transparent anode in polymer light-emitting diodes, Synthetic Metals, 82:221-223, 1996.

Yang, Y. et al., Polyanillines as a transparent electrode for polymer light-emitting diodes: Lower operating voltage and higher efficiency. Appl. Phys. Lett. 64(10):1245-1247, Mar. 7, 1994.

Yang, Y. et al., Enhanced performance of polymer light-emitting diodes using high-surface area polyanilline network electrodes, J. Apl. Phys., 77(2):694-698, Jan. 15, 1995.

McGehee, Michael D. et al., Narrow Bandwidth Luminescence from Blends with Energy Transfer from Semiconducting Conjugated Polymers to Europium Complexes. Advanced Materials, 11(16):1349-1354, 1999.

Katbuyuki, Naito et al., Molecular Design for Nonpolymeric Organic Dye Glasses with Thermal Stability: Relations between Thermodynamic Parameters and Amorphous Properties, J. Phys. Chem. 97:6240-6248, 1993.

Greczmiel, Michael et al., Polymer Light-Emitting Diodes, Macromol. Symp. 102:371-380, 1996.

Huang, Wei, A Novel Series of p-n Diblock Light-Emitting Copolymers Based on Oligothiophenes and 1,4-Bis(oxadiazolyl)-2,5-diaikyloxybenzene. Macromolecules, American Chemical Society, 32(1):118-126, 1999.

Antoniadis, Homer et al., Blue-green organic light-emitting diodes based on fluorene-oxadiazole compounds, Applied Physics Letters, 73(21):3055-3057, Nov. 23, 1998.

SOLUBLE POLY(ARYL-OXADIAZOLE) CONJUGATED POLYMERS

This application is a DIV of 10/176,473 filed Jun. 20, 2002 now U.S. Pat. No. 6,864,352; which is a CIP of 09/546,512 filed on Apr. 11, 2000 ABN.

FIELD OF THE INVENTION

This invention discloses electroluminescent, soluble, conjugated poly(aryl-oxadiazole) homopolymers and random copolymers and a method of preparing same. The polymers are prepared by polymerizing one or more dicarboxylic acids with a hydrazine salt. The polymers may be used in electroluminescent devices, diodes, photovoltaic cells, and the like.

BACKGROUND OF THE INVENTION

Semiconducting (conjugated) polymers have been studied as electroluminescent materials for use in light emitting displays since the early 1990's. Such emissive polymer displays offer a number of advantages, including high brightness at low operating voltage, low weight, thin profile and low power consumption. The relatively simple processing enabled by the use of soluble semiconducting polymers provides a pathway to low cost, high volume fabrication.

The requirements of a conjugated polymer for use in high efficiency, stable light emitting devices include high photoluminescence (PL) efficiency, good film forming ability, good thermal stability, and balanced carrier injection and transport.

High photoluminescence (PL) efficiency: In an efficient luminescent polymer medium, radiative recombination is favored over non-radiative recombination. PL efficiencies in excess of 10% are preferred; PL efficiencies in excess of 25% are still more preferred; and PL efficiencies in excess of 50% are still more preferred.

Good film forming ability: The emissive polymer should have high molecular weight; polymers which can be cast into high quality pin-hole free films by processing from solution, for example by spin-casting, are preferred. Solution processability can be achieved by introducing flexible side chains such as alkyl or alkoxy groups onto the backbone of the conjugated polymer. The polymerization chemistry should be chosen with the goal of achieving high molecular weight.

Good thermal stability: To ensure good thermal stability, the polymer should be designed to have a high glass transition temperature ($T_g$).

Balanced carrier injection and transport: High efficiency light emitting diodes (LEDs) require balanced carrier injection and transport. Ideally, the injection of holes at the anode and electrons at the cathode should be equal, and the transport mobility of electrons and holes in the polymer should be equal. For these conditions to be realized, certain electron withdrawing (and/or electron donating) groups should be incorporated into the polymer to improve electron (and/or hole) injection.

Several classes of luminescent polymers have been disclosed in the art heretofore. These include, for example, poly[1,4-phenylene vinylene] (or "PPV") (J. H. Burroughs, D. D. C. Bradley, A. R. Brown, R. N. Marks, K. Mackay, R. H. Friend, P. L. Burns and A. B. Holmes, *Nature* 347, 539 (1990)); soluble derivatives of PPV, such as (2-methoxy-5-(2'-ethylhexyloxy)-PPV (or "MEH-PPV") (U.S. Pat. No. 5,189,136); aryl-substituted-PPV (WO98/27136); and PPV copolymers (EP-544795, WO98/04610, H. Becker, H. Spreitzer, Y. Cao, *Adv. Mater.* 12(1), 42 (2000)). Soluble derivatives of polythiophene are also known in the art, e.g., the poly(3-alkylthiophenes) (D. Braun, G. Gustafssom, D. Mcbranch, *J. Appl. Phys.* 72, 564 (1992)). The photoluminescent spectra of these polymers typically fall in the visible spectral region with colors ranging from green to red. Considerable progress have been made toward using these materials in light emitting displays with lifetimes sufficient for commercial products (U.S. Pat. No. 5,798,170, I. Park, Y. Cao and C. Y. Yang, *J. Appl. Phys.* 85(4), 2441 (1999)).

For full-color display applications, blue-emitting materials are required. The search for an efficient blue-emitting electroluminescent (EL) polymer with long EL lifetime is ongoing. Among the fully conjugated and partially conjugated polymers that have been designed and synthesized, only a limited number showed promise for stable blue EL emission. Polymers and oligomers of alkyl-substituted fluorene have been disclosed by several groups. Fukuda et al. prepared 9-alkylated polyfluorene by treating the monomer with a large excess of oxidizing metal salt such as ferric chloride (Fukuda et al., *Japanese J. Appl. Phys.* 28, 1433–1435 (1989)). This process suffered from crosslinking and mislinking reactions during polymerization and resulted in a low molecular weight polymer with high polydispersity. Pei et al. disclosed polyfluorenes containing polar-alkyl substituents using dibromofluorene as a monomer (U.S. Pat. No. 5,900,327). Unfortunately, the molecular weight of the polymer obtained using this method is low. E. P. Woo et al. used the Suzuki coupling reaction for obtaining polymers and oligomers of alkyl-substituted fluorene (U.S. Pat. No. 5,777,070 and U.S. Pat. No. 5,708,130). Although relatively high EL efficiencies have been achieved for green and red polyfluorene-based LED devices with promising lifetimes, similar results for blue LEDs have not been reported (W. Wu et al., Meeting of the Society for Information Display, 1999, San Diego, Calif.).

As a result of the electron-withdrawing character of the 1,3,4-oxadiazole ring, certain low molecular weight aromatic 1,3,4-oxadiazole derivatives facilitate the injection and transport of electrons. These oxadiazole derivatives have been used in organic LED devices fabricated by the vapor deposition method (C. Adachi. T. Tsutsui, and T. Saito, *Appl. Phys. Lett.* 56, 799 (1990); C. Adachi. T. Tsutsui, and T. Saito, *Appl. Phys. Lett.* 57, 531 (1990); U.S. Pat. No. 5,656,401). However, these liquid crystalline oxadiazoles exhibited poor thermal stability. The exposure of the devices to elevated temperatures caused recrystallization or aggregation, and hence resulted in short device lifetimes (K. Naito, A. Miura, *J. Phys. Chem.* 97, 6240 (1993)).

The oxadiazole group has also been incorporated into the main chain of various polymers (Q. Pei, Y. Yang, *Chem. Mater.* 7, 1586 (1995); B. Schulz, Y. Kaminorz, L. Brehmer, *Synth. Met* 84(1–3), 449 (1997); and Z. H. Peng, Z. N. Bao, M. E. Galvin, *Adv. Mater.* 10(9), 680–684 (1998)). The polymers reported in this group were either only partially conjugated, or, when fully conjugated, had low molecular weights. The EL quantum efficiencies were poor for devices where one of these polymers was used as the emissive layer.

Polymers with the oxadiazole group as a pendant group suffered similar problems (M. Greczmiel, P. Posch, H.-W. Schmidt, P. Strohriegl, *Macromol. Symp.* 102, 371 (1996), Z. Bao, Z. Peng, M. E. Galvin, and E. A. Chandross, *Chem. Mater.* 10(5), 1201 (1998)).

Thus, there is a need for blue-emitting conjugated polymers, and more generally, visible light emitting polymers that exhibit high PL efficiency, good film forming ability, good thermal stability, and that have electronic structures consistent with balanced carrier injection and transport.

SUMMARY OF THE INVENTION

The present invention overcomes the shortcomings of the prior art blue-emitting conjugated polymers by providing blue- and visible light-emitting polymers exhibiting high PL efficiency, good film forming ability, and good thermal stability, and that have electronic structures consistent with balanced carrier injection and transport.

In a preferred embodiment of the present invention, a conjugated polymer is provided which includes at least 20 repeat units, which may independently be the same or different, represented by the formula:

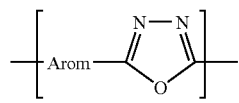

wherein Arom is a moiety selected from Formulae (1), (2), (3), and (4):

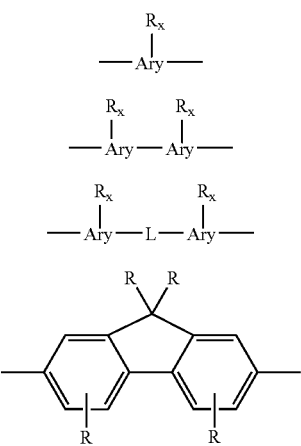

Each Ary, which may independently be the same or different, is selected from an aromatic hydrocarbon ring and a $C_{2+}$ aromatic heterocyclic ring; L is selected from an ethynyl group and a substituted or unsubstituted ethenyl group; each R, which may independently be the same or different and which may be unsubstituted or substituted by a substituent selected from cyano, nitro, and halogen, is selected from hydrogen, aryl, alkylaryl, arylalkyl, and alkyl, wherein none or one or more —$CH_2$— units of the alkyl are replaced by a moiety selected from —O—, —S—, $C_{2-14}$ aryl, and —NR'— wherein each R', which may independently be the same or different, includes a $C_{1-100}$ saturated acyclic hydrocarbyl group; and each x is the number of hydrogen atoms of Ary capable of substitution by R.

In further embodiments of the present invention, each R includes from 1 to 100 carbon atoms, more preferably from 1 to 20 carbon atoms. Each R in Formula (1) is not —H nor —$C(CH_3)_3$. Each R' includes from 1 to 20 carbon atoms. The aromatic hydrocarbon ring is selected from phenyl, fluorenyl, biphenyl, terphenyl, tetraphenyl, naphthyl, anthryl, pyrenyl, and phenanthryl. Alternatively, the aromatic hydrocarbon ring is selected from fluorenyl, terphenyl, tetraphenyl, pyrenyl, and phenanthryl. The aromatic $C_{2+}$ heterocyclic ring is selected from thiophenyl, pyrrolyl, furanyl, imidazolyl, triazolyl, isoxazolyl, oxazolyl, oxadiazolyl, furazanyl, pyridyl, bipyridyl, pyridazinyl, pyrimidyl, pyrazinyl, triazinyl, tetrazinyl, benzofuranyl, benzothiophenyl, indolyl, isoindazolyl, benzimidazolyl, benzotriazolyl, benzoxazolyl, quinolyl, isoquinolyl, cinnolyl, quinazolyl, naphthyridyl, phthalazyl, phentriazyl, benzotetrazyl, carbazolyl, dibenzofuranyl, dibenzothiophenyl, acridyl, and phenazyl. Alternatively, the aromatic $C_{2+}$ heterocyclic ring is selected from pyrrolyl, furanyl, imidazolyl, triazolyl, isoxazolyl, oxadiazolyl, furazanyl, pyridazinyl, pyrimidyl, pyrazinyl, triazinyl, tetrazinyl, benzofuranyl, benzothiophenyl, indolyl, isoindazolyl, benzimidazolyl, benzotriazolyl, benzoxazolyl, quinolyl, isoquinolyl, cinnoiyl, quinazolyl, naphthyridyl, phthalazyl, phentriazyl, benzotetrazyl, carbazolyl, dibenzofuranyl, dibenzothiophenyl, acridyl, and phenazyl. Where Arom is represented by Formula (3), the ethenyl group is of a formula:

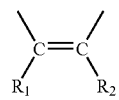

wherein $R_1$ and $R_2$, which may independently be the same or different, are selected from hydrogen, cyano, nitro, halogen, $C_{1-20}$ alkyl, and $C_{2+}$ aryl.

In a further embodiment of the present invention, the polymer includes from 20 to 300 repeat units or includes a repeat unit wherein Arom is represented by Formula (4). In yet another embodiment, the ratio of repeat units having Arom of one or more of Formulae (1), (2), (3) to repeat units having Arom of Formula (4) ranges from about 0.1:1 to about 10:1. The hydrazide end group may be capped with a benzoic acid. The carboxy end group may be capped with a benzohydrazide.

In another embodiment of the present invention, a process for preparing a polymer as described above is provided. The process includes the step of providing a reaction mixture including a hydrazine salt, an acidic reaction medium, and a dicarboxylic acid, wherein the dicarboxylic acid, which may independently be the same or different, is represented by one of Formulae (1'), (2'), (3'), and (4'):

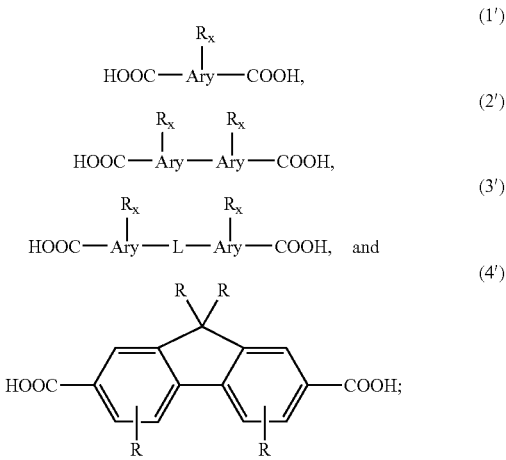

wherein each Ary, which may independently be the same or different, is selected from an aromatic hydrocarbon ring and a $C_{2+}$ aromatic heterocyclic ring; wherein L is selected from an ethynyl group and a substituted or unsubstituted ethenyl group; wherein each R, which may independently be the same or different and which may be unsubstituted or substituted by a substituent selected from cyano, nitro, and halogen, is selected from hydrogen, aryl, alkylaryl, arylalkyl, and alkyl, wherein none or one or more —$CH_2$— units of the alkyl are replaced by a moiety selected from —O—, —S—, $C_{2-14}$ aryl, and —NR'— wherein each R', which may independently be the same or different, includes a $C_{1-100}$ saturated acyclic hydrocarbyl group; and wherein each x is the number of hydrogen atoms of Ary capable of substitution by R. In one embodiment, each R in Formula (1') is not —H nor —$C(CH_3)_3$. The remaining steps of the process include polymerizing the dicarboxylic acid with the hydrazine salt and recovering a conjugated polymer.

In a further embodiment of the process, the hydrazine salt is selected from hydrazine chloride, hydrazine sulfate, and mixtures thereof. The acidic reaction medium may be selected from an organic acid, an inorganic acid, and mixtures thereof. The acidic reaction medium may include oleum or a solution of methylsulfuric acid and at least about 4 wt. % phosphorus pentoxide. The mole ratio of the dicarboxylic acid to the hydrazine salt may be at least about 1:1. The polymerizing step may be conducted for less than about 12 hours or at a temperature of less than about 110° C. The concentration of dicarboxylic acid in the reaction mixture may range from about 20 mm/l to about 150 mm/l. The dicarboxylic acid may include a mixture of at least one dicarboxylic acid of Formula (4') and at least one dicarboxylic acid of Formulae (1'), (2') and (3'). The mole ratio of dicarboxylic acid of Formula (4') to dicarboxylic acid of Formulae (1'), (2') and (3') may range, from about 0.1:1 to about 10:1.

In yet another embodiment of the present invention, an electroluminescent device is provided which includes an anode layer, a cathode layer and a polymer layer as described above. The anode layer may include a conducting material having a work function higher than about 4.5 eV or may be selected from gold, silver, nickel, copper, selenium, conductive polyaniline, conductive polypyrrole, and conductive poly(ethylenedioxythiophene). The anode layer may include an oxide compound, for example, indium-tin-oxide. The cathode layer may include a material having a work function lower than about 4.5 eV or be selected from aluminum, calcium, lithium, cesium, europium, rubidium, yttrium, magnesium, samarium, barium, or barium oxide. In yet another embodiment of the preferred invention, the thickness of the polymer layer is less than about 1000 nm, more preferably less than about 200 nm. The thickness of the anode layer may range from between about 20 nm to about 200 nm. The thickness of the cathode layer may range from between about 20 nm to about 200 nm. The device may additionally include a hole transport layer, wherein the hole transport layer is positioned between the anode layer and the polymer layer. The hole transport layer may include an arylamine or polyvinylcarbazole. The thickness of the hole transport layer may be less than about 100 nm. The electroluminescent device may additionally include a support layer in a rigid or a flexible form, for example, a glass or an organic polymer such as polyester, polystyrene, polycarbonate, polyolefin, and polyethylene terephthalate.

In further preferred embodiments, the anode layer includes a first anode layer and a second anode layer, wherein the second anode layer is positioned between the first anode layer and the polymer layer, and wherein the second anode layer includes a different material than the first anode layer. The thickness of the second anode layer may range from about 50 nm to about 300 nm. The first anode layer may include indium-tin-oxide and the second anode layer may be selected from conductive polyaniline, conductive polypyrrole, and conductive poly(ethylenedioxythiophene). The cathode layer may a first cathode layer and a second cathode layer, wherein the second cathode layer is positioned between the first cathode layer and the polymer layer, and wherein the second cathode layer includes a different material than the first cathode layer. The second cathode layer may be selected from a metal, an alloy, and a compound, for example, lithium fluoride, dilithium oxide, and barium oxide. The thickness of the second cathode layer may range from about 1 nm to about 500 nm. The first cathode layer may be selected from aluminum and silver and the second cathode layer may be selected from cesium and barium.

In a further embodiment of the present invention, a diode, an electrical switching device, a thin film metal/polymer/metal device, an electronic device, an optical device, and an optoelectronic device including the polymer described above is provided.

In yet another embodiment of the present invention, an electroluminescent device including the polymer described above is provided. The device may further include a cathode layer including a metal or metal alloy having a work function lower than about 4.5 eV. The device may have a polymer layer including the polymer, as well as a thin buffer layer situated between the polymer layer and the cathode layer, where the buffer layer is selected from an alkali fluoride, an alkaline earth fluoride, an alkali oxide, and an alkaline earth oxide.

In yet another embodiment of the present invention, a photovoltaic cell including the polymer described above is provided. The cell may include a cathode layer including a metal or metal alloy having a work function lower than about 4.5 eV. The cell may have a polymer layer including the polymer, as well as a thin buffer layer situated between the polymer layer and the cathode layer, where the buffer layer is selected from an alkali fluoride, an alkaline earth fluoride, an alkali oxide, and an alkaline earth oxide.

In yet another embodiment of the present invention, a photosensing device including the polymer described above is provided. The device may further include a cathode layer including a metal or metal alloy having a work function lower than about 4.5 eV. The device may have a polymer layer including the polymer, as well as a thin buffer layer situated between the polymer layer and the cathode layer, where the buffer layer is selected from an alkali fluoride, an alkaline earth fluoride, an alkali oxide, and an alkaline earth oxide.

In a further embodiment of the present invention, a method for preparing an electroluminescent device is provided. The method includes providing a polymer as described above, preparing a solution of the polymer in an organic solvent; and casting the solution onto a substrate, thereby forming a polymer layer on the substrate. The organic solvent is selected from tetrahydrofuran, toluene, xylene, tetrachloroethane, and mixtures thereof. The dissolving step may include adding the polymer to the solvent, stirring the mixture until a clear solution is formed, and filtering the solution. The dissolving step may be conducted at about room temperature. The casting -step may include a casting method selected from spin-casting, dip-casting, drop-casting, film-casting, and ink jet printing. The casting step may include spin casting polymer solution onto the substrate at a cast speed in the range of about 400 rpm to about 5,000 rpm. The polymer layer may range in thickness from about 300 Å to about 5,000 Å.

DETAILED DESCRIPTION OF THE PREFERRED EMBODIMENT

Figure 1A:
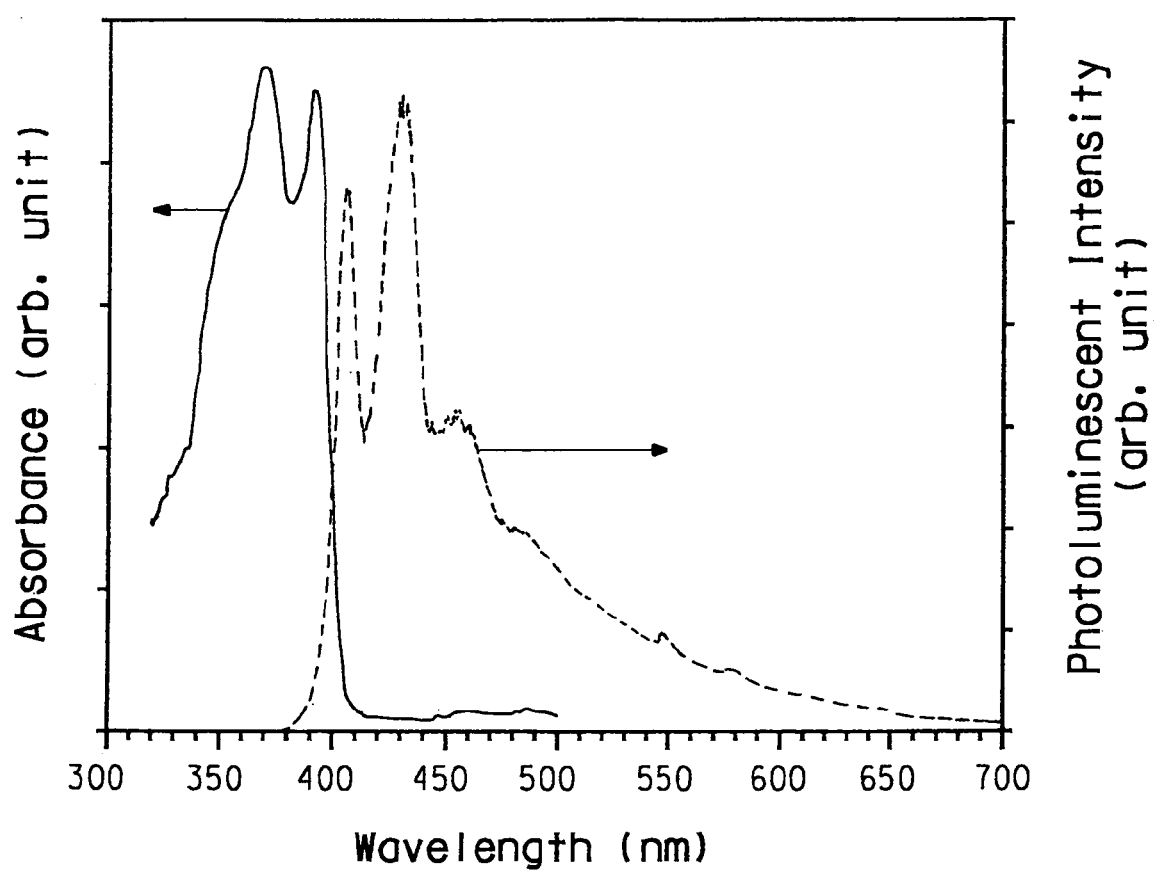
FIG. 1(a) Absorption (solid line) and photoluminescence (dotted line) spectra of a film of poly(fluorene-oxadiazole) from Example 7; (b) Absorption (dotted line) and photoluminescence (solid line) spectra of a film of poly(phenylene-oxadiazole) from Example 18.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

Preparation of Fluorenedicarboxylic Acid

The molecular structure of fluorenedicarboxylic acid, which may be used to prepare poly(fluorene-oxadiazole), a poly(aryl-oxadiazole) of a preferred embodiment, is shown as Formula (4').

In a preferred embodiment, R, which may independently be the same or different, are selected from hydrogen, alkyl, aryl, arylalkyl, and alkylaryl. The alkyl, aryl, arylalkyl, and alkylaryl groups may be substituted by one or more cyano, nitro, or halogen groups. Alkyl groups may be straight-chain, branched-chain, cyclic, or combinations thereof. Alkyl groups preferably contain from 1 to 100 carbon atoms, more preferably from 1 to 20 carbon atoms. One or more of the —$CH_2$— groups of the alkyl group may be replaced by another group including —O—, —S—, —NR', and $C_{2-14}$ aryl. R' is a $C_{1-100}$ saturated acyclic hydrocarbyl group.

To synthesize fluorenedicarboxylic acids, dibromofluorene is first converted to a Grignard reagent, preferably using about 200 mole percent or greater magnesium. The magnesium is placed in a flask and preheated, preferably between 70–100° C. The process is preferably conducted in the absence of oxygen and moisture, more preferably under an inert atmosphere such as dry nitrogen or argon. A trace amount of iodine, preferably less than about 10 mg, as a catalyst is present in the reaction mixture. The iodine is added before the dibromofluorene.

Dibromofluorene (preferably about 30 weight percent to 60 weight percent, and more preferably 50 weight percent) in dry non-protonic polar solvent (preferably tetrahydrofuran) is added in two portions. The first portion of the solution is added to initialize the reaction, as indicated by the disappearance of iodine color from the solution. The remainder of the dibromofluorene solution is then added dropwise to the mixture. Generally, at least 1 hour, but more preferably 2 hours, of refluxing is needed to completely covert the dibromofluorene to the Grignard reagent.

To prepare the fluorenedicarboxylic acid, the Grignard reagent of dibromofluorene is cooled to room temperature and an excess amount of dry ice (preferably about 5000 mole percent) is added. The mixture is shaken until the dry ice is well mixed with the reaction mixture. After the excess amount of dry ice has evaporated, about 5000 mole percent of hydrochloric acid is added to the residue. The acidified residue is then extracted by an organic solvent, preferably ethyl acetate, at least three times. The organic layers are combined, washed with water, and then dried over $MgSO_4$. After evaporation of the solvent, hexane is added and the product precipitated as a white solid, which is then isolated by filtration.

Purification of the fluorenedicarboxylic acid is important in obtaining high molecular weight and pure polymer. This purification can be carried out, for example, by recrystallization from an organic solvent, preferably from methanol.

Suitable fluorenedicarboxylic acids that may be prepared according to the above method include 9,9-di-(2-ethylhexyl)-fluorenedicarboxylic acid and 9,9-bis-(3,5,5-trimethylhexyl)-fluorenedicarboxylic acid.

Preparation of Non-Fluorene Aryl Dicarboxylic Acids

In addition to poly(fluorene-oxadiazole)homopolymers, other poly(aryl-oxadiazole)homopolymers and copolymers are also contemplated which are derived from non-fluorene aryl dicarboxylic acids. The molecular structures of other suitable aryl dicarboxylic acids include those of Formulae (1'), (2'), and (3'):

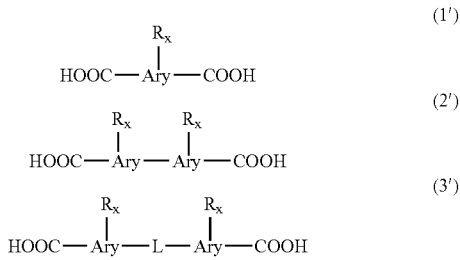

In a preferred embodiment, R, which may independently be the same or different, are selected from hydrogen, alkyl, aryl, arylalkyl, and alkylaryl. In one embodiment, each R in Formula (1') is not —H nor —$C(CH_3)_3$. The alkyl, aryl, arylalkyl, and alkylaryl groups may be substituted by one or more cyano, nitro, or halogen groups. Alkyl groups may be straight-chain, branched-chain, cyclic, or combinations thereof. Alkyl groups preferably contain from 1 to 100 carbon atoms, more preferably from 1 to 20 carbon atoms. One or more of the —CH$_2$— groups of the alkyl group may be replaced by another group including —O—, —S—, —NR', and C$_{2-14}$ aryl. R' is a C$_{1-100}$ saturated acyclic hydrocarbyl group. The subscript x corresponds the number of hydrogen atoms of Ary capable of substitution by R.

In a preferred embodiment, Ary comprises an aromatic hydrocarbon group or an aromatic heterocyclic group. Suitable aromatic hydrocarbon groups include phenyl, fluorenyl, biphenyl, terphenyl, tetraphenyl, naphthyl, anthryl, pyrenyl, and phenanthryl groups. Alternatively, the aromatic hydrocarbon ring is selected from fluorenyl, terphenyl, tetraphenyl, pyrenyl, and phenanthryl. Suitable aromatic heterocyclic groups include thiophenyl, pyrrolyl, furanyl, imidazolyl, triazolyl, isoxazolyl, oxazolyl, oxadiazolyl, furazanyl, pyridyl, bipyridyl, pyridazinyl, pyrimidyl, pyrazinyl, triazinyl, tetrazinyl, benzofuranyl, benzothiophenyl, indolyl, isoindazolyl, benzimidazolyl, benzotriazolyl, benzoxazolyl, quinolyl, isoquinolyl, cinnolyl, quinazolyl, naphthyridyl, phthalazyl, phentriazyl, benzotetrazyl, carbazolyl, dibenzofuranyl, dibenzothiophenyl, acridyl, and phenazyl groups. Alternatively, the aromatic heterocyclic group is selected from pyrrolyl, furanyl, imidazolyl, triazolyl, isoxazolyl, oxadiazolyl, furazanyl, pyridazinyl, pyrimidyl, pyrazinyl, triazinyl, tetrazinyl, benzofuranyl, benzothiophenyl, indolyl, isoindazolyl, benzimidazolyl, benzotriazolyl, benzoxazolyl, quinolyl, isoquinolyl, cinnolyl, quinazolyl, naphthyridyl, phthalazyl, phentriazyl, benzotetrazyl, carbazolyl, dibenzofuranyl, dibenzothiophenyl, acridyl, and phenazyl.

The linking group L can comprise an ethenyl group or an ethynyl group. The ethenyl group can have the formula:

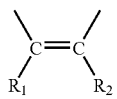

wherein R$_1$ and R$_2$, which can be the same or different, are selected from hydrogen, cyano, nitro, halogen, C$_{1-20}$ alkyl, and C$_{2+}$ aryl.

The aryl dicarboxylic acids described above are available commercially, or may be prepared according to synthetic methods well known in the art. A few examples of suitable aryl dicarboxylic acids include, terephthalic acid, 2,5-dialkoxyterephthalic acids, 2,6-naphthalenedicarboxylic acid, and 2,5-thiophlenedicarboxylic acid.

In a preferred embodiment, a 2,5-dialkoxyterephthalic acid may be used to prepare certain poly(aryl-oxadiazoles). The general formula for a 2,5-dialkoxyterephthalic acid is shown below:

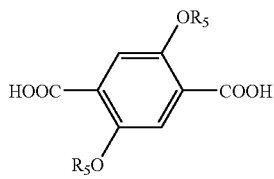

In the formula, R5 and R6 are straight-chain C$_{1-100}$ alkyl, branched-chain C$_{1-100}$ alkyl, cyclic C$_{1-100}$ alkyl, and C$_{2-14}$ aryl groups. One or more of the —CH$_2$— groups of the C$_{1-100}$ alkyl group may be replaced by another group selected from —O—, —S—, —NR', and C$_{2-14}$ aryl. R' is a straight-chain C$_{1-100}$ alkyl, branched-chain C$_{1-100}$ alkyl, or cyclic C$_{1-100}$ alkyl. One or more of the hydrogen atoms of the C$_{1-100}$ alkyl group may be replaced by a C$_{2-14}$ alkyl or C$_{2-14}$ aryl. Preferably, the C$_{1-100}$ alkyl groups comprise C$_{1-20}$ alkyl groups.

To synthesize a 2,5-dialkoxyterephthalic acid, diethyl-2,5-dihydroxy terephthalate is first oxygen-alkylated by an alkyl halide, e.g., alkyl bromide or alkyl chloride, in a non-protonic polar solvent such as DMSO. The mixture of 2,5-dialkoxyterephthalic acid, alkyl halide and potassium carbonate in DMSO is heated under an inert atmosphere such as dry nitrogen or argon. The alkyl halide and potassium carbonate are preferably present at 200 mole percent or more. The reaction is preferably conducted at a temperature is preferably between 80–110° C. Preferably, the reaction mixture is heated 20 hours or more in order to complete the alkylation reaction.

The reaction mixture is then poured into water and extracted by an organic solvent, preferably ethyl acetate, at least three times. The organic layers are combined, washed by an aqueous solution of potassium hydroxide (5 weight percent or less), then dried over MgSO$_4$. The crude product of diethyl-2,5-dialkoxy terephthalate is obtained after evaporation of the solvent.

The crude diethyl-2,5-dialkoxy terephthalate may be converted to 2,5-dialkoxyterephthalic acid without purification. To do so, it is first dissolved in ethanol (preferably present at 1000 weight percent), then 100 weight percent of potassium hydroxide is added to the solution. The mixture is then refluxed for at least 2 hours before it is mixed with water, preferably present at 200 weight percent of reaction mixture.

After the aqueous solution is filtered, it is acidified with 8M HCl and the resulting precipitate, which is the crude product of 2,5-dialkoxyterephthalic acid, can be isolated by filtration.

Purification of 2,5-dialkoxyterephthalic acid can be done by recrystallization from an organic solvent, such as ethyl acetate, or a mixture of ethyl acetate and hexane.

This procedure may be used to prepare a variety of 2,5-dialkoxyterephthalic acids.

Preparation of the Polymer

The polymers and copolymers of this invention have about at least 20 repeat units, which may independently be the same or different, represented by the formula:

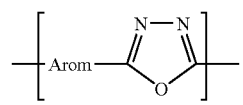

wherein Arom, which may independently be the same or different, is a moiety represented by one of Formulae (1), (2), (3), and (4):

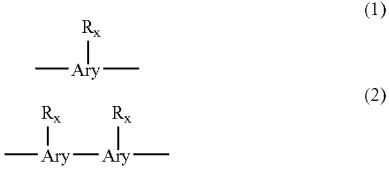

-continued $$-Ary-L-Ary- \quad (3)$$
$$\overset{R_x \quad R_x}{|\quad|}$$

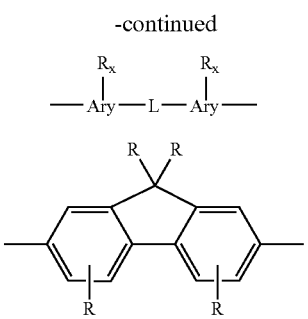
(4)

and wherein each Ary, each R, and each x are as described above. In one embodiment, each R in Formula (1) is not —H nor —C(CH$_3$)$_3$. In a preferred embodiment, the polymer comprises at least about 20 repeat units. In another embodiment the polymer comprises from about 20 to 300 repeat units. Different combinations of repeat units based on the above Formulae will result in various homopolymers and copolymers. If the repeat unit comprises Formula (4) only, then a fluorene-oxadiazole homopolymer will result. Random copolymers of fluorene-oxadiazole and non-fluorene aryl-oxadiazoles may also be prepared. Preferably, the monomer ratio of fluorene-oxadiazole to non-fluorene aryl-oxadiazole in such random copolymers will range from about 0.1:1 to about 10:1. In general, a high ratio of fluorene-oxadiazole to non-fluorene aryl-oxadiazole will result in enhanced solubility of the polymer if the aryl monomer has no substituents. A high ratio of fluorene-oxadiazole to non-fluorene aryl-oxadiazole will give a bluer color emission if the aryl group is thiophene or another lower band gap monomer.

The process for synthesizing the poly(aryl-oxadiazole) polymers and copolymers of this invention is illustrated by the following equation, which depicts the formation of a random copolymer of fluorene-oxadiazole and a non-fluorene aryl-oxadiazole corresponding to Formula (1') above:

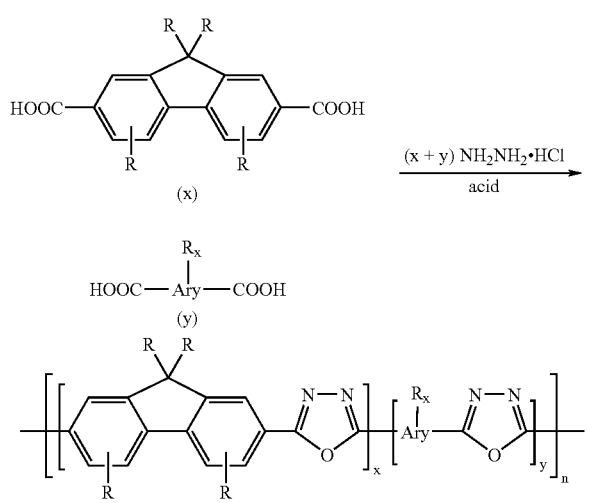

To prepare poly(aryl-oxadiazole)homopolymer, aryl dicarboxylic acid and hydrazine salt are preferably present in the reaction mixture in equal mole percentages. The hydrazine salt is preferably hydrazine hydrochloride.

To prepare poly(fluorene-oxadiazole)homopolymer, fluorenedicarboxylic acid and hydrazine salt are preferably present in the reaction mixture in equal mole percentages. The hydrazine salt is preferably hydrazine hydrochloride.

To prepare a copolymer of fluorene-oxadiazole and aryl-oxadiazole, a mixture of fluorenedicarboxylic acid and aryl dicarboxylic acid is reacted with a hydrazine salt. In a preferred embodiment, the total mole percent of all dicarboxylic acids is preferably equal to the mole percent of hydrazine salt, which is preferably hydrazine hydrochloride.

The reaction solvents suitable for use in this process include those organic or inorganic acids which can dissolve a drying agent and the resulting poly(aryl-oxadiazole)polymer. Examples of suitable solvents include fuming sulfuric acid, preferably methylsulfuric acid with at least 4% of $P_2O_5$. The solubility of the starting material in the solvent at room temperature is not critical to the reaction. When a suspension of the reaction mixture is heated, a homogeneous solution is formed that drives the reaction to completion.

The mixture of methylsulfuric acid and $P_2O_5$ can be obtained in a number of ways. For example, one can dissolve a specific amount of $P_2O_5$ in methylsulfuric acid by heating. Alternatively, and preferably, the mixture of methylsulfuric acid and $P_2O_5$ can be obtained by vacuum distillation of Eaton's reagent, which is commercially available from Aldrich.

It is important to make certain that the dicarboxylic acid monomer does not degrade in the reaction solvent. To test for degradation of the dicarboxylic acid monomer, 5 mg of dicarboxylic acid monomer is placed in 1 ml of distilled Eaton's reagent and the suspension is heated with a heat gun. The suspension should remain colorless or light yellow. If the color of the mixture darkens during heating process, the monomer is not suitable for the polymerization reaction.

Preferably, the upper limit of the temperature for this reaction is about 130° C., and more preferably about 110° C.

The monomer concentration in the reaction mixture for dicarboxylic acid or hydrazine hydrochloride is preferably from about 20 mmol/l to about 150 mmol/l, more preferably from about 50 mmol/l to 100 mmol/l, and most preferably about 80 mmol/l.

The polymerization reaction proceeds rapidly. Preferably, the reaction time is between about 1 hour and 24 hours. More preferably, it is between about 2 hours and 16 hours, and most preferably about 5 hours.

The end group for the polymer thus produced will be either the carboxy group or the hydrazide group. In a preferred embodiment, the end groups are capped. Benzoic acid can be used to cap the hydrazide end group, and benzohydrazide can be used to cap the carboxy end group.

The polymer can be purified by cooling the polymerization reaction mixture to room temperature, then pouring it into an approximately 20 times excess amount of deionized ("D.I.") water with stirring. Polymer fiber is then precipitated from the water and isolated, then washed alternately by water and methanol until neutralized. The resulting polymer product is then vacuum dried at about 60° C. for about 12 hours.

The crude polymer is then dissolved in an organic solvent, preferably tetrahydrofuran, to form a concentrated solution. The concentrated solution preferably contains from about 1 to 10 weight percent, and more preferably about 5 weight percent, of the polymer. The solution is passed through a 5 µm filter and then poured into an approximately 20 times excess amount of methanol with stirring. The polymer is precipitated, isolated, then washed alternately by water and methanol. Preferably, this process should be repeated for at least two times before the polymer is finally dried under vacuum.

Optoelectronic Devices Incorporating Poly(fluorene-oxadiazole)

Poly(fluorene-oxadiazole) ("PFO") and other poly(aryl-oxadiazole)homopolymers and copolymers as described above may be used in a variety of optical, electronic, and optoelectronic devices, including, but not limited to, electroluminescent devices, diodes, photovoltaic cells, photosensing devices, electrical switching devices, various thin film metal/polymer/metal devices, and the like.

Because these polymers are soluble in common organic solvents, e.g., tetrahydrofuran ("THF"), toluene, xylenes, or tetrachloroethane, optical quality, pinhole-free thin films can be fabricated on rigid or flexible substrates such as glasses, plastics and silicon by spin-casting, dip-casting, drop-casting, ink-jet printing, or other methods of casting thin solid films from solution. Non-limiting examples of suitable plastic substrates include polyesters, polystyrenes, polycarbonates, polyolefins, polyethylene terephthalate, and the like.

In a preferred embodiment, the polymer is dissolved in toluene or tetrachloroethane, more preferably in toluene. For film casting, the concentration of the solution is preferably from about 1 to 15 mg/ml, more preferably about 10 mg/ml. Generally, the polymer may be dissolved in the solvent at room temperature. However, under certain conditions it may be desirable to heat the solvent so as to increase the rate of dissolution of the polymer.

To prepare the polymer solution, the polymer is stirred in the selected solvent at room temperature for several hours. After a clear solution is formed, it is filtered through a 1 μm filter. Pinhole-free, uniform films can be obtained by spin-casting the solution at room temperature. Preferably, the cast speed is in the range of about 400 rpm to 5,000 rpm. High quality films with thicknesses ranging from about 300 Å to about 5,000 Å can be obtained by varying the spin speed and the concentration of the solution. Films having large areas and thicknesses ranging from about 0.03 μm to about 20 μm can be prepared by dip casting or drop casting. PFO films are transparent to visible light with an absorption edge at approximately 400 nm. Such films exhibit-blue photoluminescence with quantum efficiencies ranging from about 30% to about 60%.

With the proper selection of different aryl groups ("Ary" in Formulae (1), (2) and (3)), films may be formed from solution that have different optical characteristics with various emission colors in the visible spectral range. The color of the emission of a conjugated polymer depends on the Highest Occupied Molecular Orbital-Lowest Unoccupied Molecular Orbital ("HOMO-LUMO") gap, or band gap of the polymer $E_g$, which is believed to be determined by several factors: the energy related to bond length alternation $E^{\delta r}$, the mean deviation from planarity $E^\theta$, the aromatic resonance energy of the cycle $E^{res}$, the inductive electronic effects of substitution $E^{sub}$, and the intermolecular or interchain coupling in the solid state $E^{int}$ (Jean Roncali, Chem. Rev. 97,173–205 (1997)).

$$E_g = E^{\delta r} + E^\theta + E^{res} + E^{sub} + E^{int}$$

In PFO, $E^{\delta r} + E^\theta + E^{res}$ results in the band gap falling into the blue region. The substituents on the 9-position of fluorene have little effect in determining the band gap, since they are not conjugated to the main chain. In the solid state, PFO emits both white light and blue light because of interchain coupling.

To build a copolymer with lower band gap, the proper aryl dicarboxylic acid monomers are selected so that one or several energetic contribution can be reduced.

Preferably, one or more of thiophene, substituted thiophene, isothianaphthene, substituted isothianaphthene, fused thiophene, and bithienyl are used when designing a lower band gap conjugated polymer. For example, when the aryl group Ary is thiophene (as in Example 14 below), the color of the emission is red-shifted 70 nm when compared with the PFO homopolymer (as in Example 20 below).

Compared with poly(fluorene-oxadiazole), poly(alkoxyphenylene-oxadiazole) emits bluish green light (as in example 17 and 18, shown in FIG. 1b) because its band gap is narrower than the band gap of poly(fluorene-oxadiazole). The main reduction of energetic contribution may come from the alkoxy side chain on the phenyl ring. One factor is the electron donating character of alkoxy group. Another factor is that the bond length of the C—O bond is longer than that of the C—H bond, which may make the C—O bond less sterically hindered so that the planarity of the poly(alkoxyphenylene-oxadiazole) is better than that of poly(fluorene-oxadiazole).

The polymer materials disclosed in this invention can be used to fabricate thin film devices in the anode-semiconductor-cathode sandwich configuration well-known in the art (see, e g., J. H. Burroughs, D. D. C. Bradley, A. R. Brown, R. N. Marks, K. Mackay, R. H. Friend, P. L. Burns, and A. B. Holmes, Nature 347, 539 (1990), D. Braun and A. J. Heeger, Appl. Phys. Lett. 58, 1982 (1991); U.S. Pat. No. 5,869,350). When the anode and cathode have different work functions, these thin film devices function as diodes which show rectification characteristics. Such diodes can be used for electrical switching applications, and can function as light emitting diodes, e.g., as photo-detecting diodes and as photovoltaic cells (I. D. Parker, J. Appl. Phys. 75, 1656 (1994); G. Yu Synthetic Metals 80, 143 (1996)). Metallic materials with work functions higher than 4.5 eV, such as Au, Ag, Ni, Cu, Se, and polyaniline ("PANI") can be used as the anode electrode in these devices. In order to form a semitransparent anode from such metal, the thickness of the layer should be less than about 100 nm. If the anode need not be transparent, then thicker electrode may be used to carry the current, thereby minimizing resistance in the electrode. Preferably, an Indium-Tin-Oxide ("ITO") or aluminum-tin-oxide coating on a glass substrate is used as the transparent anode. When ITO or other metal oxides are used as the anode layer, the preferred thickness of the layer ranges from about 20 to about 200 nm.

Poly(ethylenedioxythiophene) ("PEDOT") and PANI are conductive polymers which are semi-transparent as thin films (see, e.g.; U.S. Pat. No. 5,470,505). Conductive polypyrrole may also be used as an anode. For some applications, bilayer electrodes comprising ITO/PEDOT or ITO/PANI are used as the transparent anode (G. Gustafsson, Y. Cao, G. M. Treacy, F. Klavetter, N. Colaneri, and A. J. Heeger Nature, 357, 477 (1992); Y. Yang and A. J. Heeger, Appl. Phys. Lett. 64, 1245 (1994); U.S. Pat. No. 5,723,873; Y. Yang, E. Westerweele, C. Zhang, P. Smith and A. J. Heeger, J. Appl. Phys. 77, 694 (1995); J. Gao, A. J. Heeger, J. Y. Lee and C. Y. Kim, Synth. Met. 82, 221 (1996); Y. Cao, G. Yu, C Zhang, R. Menon and A. J. Heeger, Appl. Phys. Left. 70, 3191 (1997)). If the conductive polymer (e.g., doped PEDOT, polypyrrole, or PANI) has a conductivity-close to ITO, then it can replace the ITO as the anode. In those cases where the conductivity of the polymer is not of primary importance, the polymer can serve to planarize the surface of the device and improve the device's lifetime. In bilayer electrodes having both an anode and a cathode, the layer away from the electroluminescent polymer takes care of the conductivity and carries the current, while the one close to the electroluminescent polymer optimizes the charge injection and surface properties. In the case of a preferred embodiment of an ITO/PANI bilayer electrode, the typical thickness of the ITO layer is about 140 nm and the typical thickness of the PANI layer is about 200 nm. The PANI layer in such an embodiment can be used to smooth out the roughness of the ITO surface and modify the work function to improve carrier injection.

In a preferred embodiment, metallic materials with relatively low work functions (lower than about 4.5 eV) such as Ba, Li, Ce, Cs, Eu, Rb, Y, Mg, and Sm are preferred for use as cathode materials in the devices (I. D. Parker, *J. Appl. Phys.* 75, 1656 (1994)). If the cathode is to be semitransparent, the thickness of the layer should be less than about 100 nm. If the cathode need not be transparent, then a thicker electrode may be used to carry the current, thereby minimizing resistance in the electrode. For light emission, calcium or, more preferably, barium is used as the cathode electrode. Ultrathin metal oxide layers such as BaO may also be used as the cathode for efficient electron injection, as described in U.S. Ser. No. 09/173,157. Other suitable metal oxides include LiF and $Li_2O$.

The thickness of the electroluminescent polymer layer is preferably less than about 1000 nm, more preferably less than about 100 nm (U.S. Ser. No. 08/872,657).

In a preferred embodiment, two cathode layers are utilized. The first cathode layer comprises a metal having a work function about 4.5 eV to 4.6 eV, e.g., aluminum or silver. The second cathode layer, which could comprise a metal, an alloy, or a compound, would be positioned between the first cathode layer and the polymer layer. Suitable compounds for use in the second cathode layer would include, for example, BaO, LiF and $Li_2O$.

The efficiency of light emitting devices ("LEDs") fabricated using poly(fluorene-oxadiazole) may be improved by inserting a hole transport layer into the structure. Such a layer preferably comprises an arylamine, most preferably polyvinylcarbazole ("PVK") and is situated between the anode layer and the poly(fluorene-oxadiazole) layer. Such a device structure is as follows: ITO/PEDOT (80 nm)/PVK (30 nm)/PFO (100 nm)/Ba (5 nm)/Al (100 nm). The numbers in parentheses reflect the nominal thickness of the corresponding layers.

As demonstrated in the Examples, blue light emission with external quantum efficiencies in excess of 1% ph/el can be achieved with LEDs based on PFO. The CIE ("Commission Internationale de l'Éclairage" or International Commission on Illumination) color coordinates of the blue emission are x=0.18, y=0.15, close to the values recommended for color display applications. These electroluminescent devices can be operated at low bias voltage. Light emission is typically observed above 4 volts, reaches about 100 cd/m$^2$ at about 8 V, and reaches over $10^3$ cd/m$^2$ at 10V. These numbers are comparable with the best blue polymer LEDs demonstrated to date.

Polymer LEDs with relatively high efficiency EL emissions may also be fabricated using a stable metal as the cathode. One such device structure is glass/ITO/PEDOT (80 nm)/PVK (30 nm)/PFO (100 nm)/cathode. A variety of metals may be used as cathode materials, including Ba, Sm, Ca and Al. To evaluate the effect of the work function of the different cathode metals on the device performance, Ca and Al were selected for comparison as cathode materials. The work functions of these two metals are 2.9 eV and 4.2 eV, respectively. Relatively high electroluminescence quantum efficiency ("EQE"), on the order of about 0.15% to about 0.2% ph/el may be obtained in devices made with an Al cathode. The ratio of EQE for the Ca devices to that of the Al devices is approximately 5. This is in sharp contrast to the ratio of about $10^2$ to $10^3$ typically observed in devices fabricated from other blue luminescent polymers synthesized using other approaches (see, e.g., U.S. Pat. No. 5,900,327). This difference is of potential importance in practical applications, since Al is an air stable material. AgMg alloys are also well known in the art as alternative stable cathode materials.

High EL efficiency may also be achieved by improving hole injection into poly(fluorene-oxadiazole) layer. The significant difference in EL efficiency between devices constructed using PVK (work function 5.5 eV) and PEDOT (work function 5.2 eV) suggests that the highest occupied molecular orbital of PFO is close to about 5.5 eV or higher.

Materials comprising the polymers described above may be used as the photo-active layer in high photosensitivity photovoltaic cells and photodetectors (U.S. Pat. No. 5,331,183 and U.S. Pat. No. 5,454,880). By selecting a material with an absorption edge at approximately 400 nm or shorter, visible-blind UV detectors can be obtained.

In applications involving electroluminescent, photovoltaic, or photosensing devices, it may be desirable to include a thin buffer layer between the active polymer and the cathode layer. Suitable materials for use in the buffer layer include, for example, alkali fluorides, alkaline earth fluorides, alkali oxides, and alkaline earth oxides. In applications involving electroluminescent devices, it is desirable to use a metal or metal alloy having a work function lower than about 4.5 eV as the cathode.

Blends comprising PFO as host and green or red emitting species as guest can be used as electroluminescent materials to generate light with longer wavelength emission. In such materials, electrons and holes are injected into the π* and π bands, respectively, of the host PFO. Longer wavelength emission follows excitation transfer to the guest species (M. D. McGehee, T. Bergstedt,; C. Zhang, A. P. Saab, M. O'Regan, G. Bazan, V. Srdanov and A. J. Heeger, *Adv. Mater.* 11, 1349 (1999)).

EXAMPLES

Example 1

Synthesis of 9,9-di-(2-ethylhexyl)-fluorene

A solution of 40 g fluorene in 200 ml of THF was cooled down in a dry ice/acetone bath under nitrogen. n-BuLi (2.5 M in hexane, 2.1 equiv. of fluorene) was added to the solution dropwise by syringe. A yellow lithium salt of fluorene formed and was precipitated from the solution. After 1 hour of stirring, the temperature of the reaction mixture had recovered to room temperature. The reaction mixture was then placed in an ice/water bath. A solution of 104 g of 2-ethylhexyl bromide in 100 ml of THF was added dropwise to the reaction mixture over 1.5 hours. After completion of the addition, the reaction mixture was stirred at room temperature under nitrogen overnight.

The reaction mixture was poured into 600 ml of water and extracted by ethyl acetate (3×300 ml). The organic layers were combined and dried over MgSO$_4$. Evaporation of the organic solvents afforded a crude product, which was purified by vacuum distillation. The yield of the product was 67 g (74%).

Proton NMR verified the following structure:

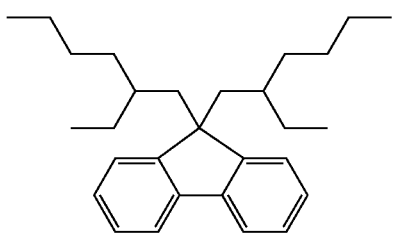

$^1$H-NMR (500 MHz, CDCl$_3$) δ ppm: 7.68 (d, J=7.5 Hz, 2H, fluorene ring), 7.36 (m, 2H, fluorene ring), 7.30 (t, J=8 Hz, 2H, fluorene ring), 7.24 (t, J=7 Hz, 2H, fluorene ring), 1.97 (m, 4H, H-alkyl), 0.64–0.95 (m, 22H, H-alkyl), 0.45–0.54 (m, 8H, H-alkyl).

Example 2

Synthesis of 2,7-dibromo-9,9-di-(2-ethylhexyl)-fluorene

A solution of 90 g 9,9-di-(2-ethylhexyl)-fluorene in 500 ml of chloroform was cooled in an ice/water bath. 90 g of bromine was added to the solution dropwise in the dark. After the addition of bromine, the reaction mixture was stirred for 1 hour, and then it was poured into 500 ml of a saturated aqueous solution of sodium carbonate. Additional sodium carbonate was added to the mixture until the organic layer became colorless. The organic layer was then separated and the aqueous layer was extracted by chloroform two times (2×200 ml). The organic layers were combined and washed by a 5% solution of sodium hydroxide and then water, then dried over MgSO$_4$. Evaporation of solvents afforded a crude product, which was further purified by passing over a short silica gel column using hexane as the eluent. The yield of the product was 114 g (90%).

Proton NMR verified the following structure:

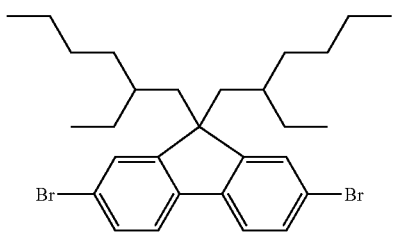

$^1$H-NMR (500 MHz, CDCl$_3$) δ ppm: 7.51 (d; J=8.5 Hz, 2H, fluorene ring), 7.48 (d, 2H, J=5 Hz, fluorene ring), 7.44 (d, J=8 Hz, 2H, fluorene ring), 1.94 (m, 4H, H-alkyl), 0.64–0.98 (m, 22H, H-alkyl), 0.45–0.56 (m, 8H, H-alkyl).

Example 3

Synthesis of 9,9-di-(2-ethylhexyl)-fluorene-2,7-dicarboxylic acid 7 g of magnesium was placed in a 500 ml flask and preheated to 100° C. under dry nitrogen. 5 mg of iodine was added, followed by the first part of a solution (20 ml) of 50 g of 2,7-dibromo-9,9-di-(2-ethylhexyl)-fluorene in 100 ml of dry THF. After the reaction was initialized (as indicated by the disappearance of color from the solution), the remainder of the solution was added dropwise with a syringe. After the addition, the reaction mixture was refluxed for 1 hour and an additional 100 ml of dry THF was added. The reaction mixture was then cooled to room temperature. 500 g of dry ice was added to the reaction mixture, and the flask was shaken until the dry ice was well mixed. After the excess amount of dry ice had evaporated, 800 ml of 18% hydrochloric acid was added to the residue. The acidified residue was extracted three times by ethyl acetate (3×200 ml). The organic layers were combined and washed with 400 ml water and then dried over MgSO$_4$. After evaporation of the solvents, 200 ml of hexane was added. The product precipitated as a white solid which was isolated by filtration. Further purification by recrystallization from methanol afforded 25 g of product as a white solid. The yield of product was 57%.

Proton NMR verified the following structure:

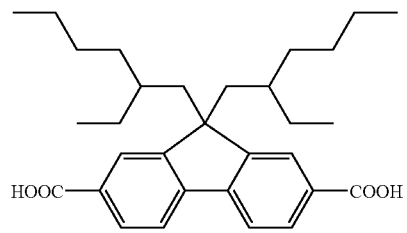

$^1$H-NMR (500 MHz, THF-d$_8$) δ ppm: 8.17 (t, J=6.5 Hz, 2H, fluorene ring), 8.06 (d, 2H, J=8 Hz, fluorene ring), 7.89 (d, J=8 Hz, 2H, fluorene ring), 2.13 (d, J=5 Hz, 4H, H-alkyl), 0.65–0.95 (m, 22H, H-alkyl), 0.45–0.54 (m, 8H, H-alkyl).

Example 4

Synthesis of 9,9-bis-(3,5,5-trimethylhexyl)-fluorene

A solution of 40 g fluorene in 200 ml of THF was cooled in a dry ice/acetone bath under nitrogen. n-BuLi (200 ml, 2.5 M in hexane) was added to the solution dropwise by syringe. A yellow lithium salt of fluorene was formed and precipitated from the solution. After 1 hour of stirring, the temperature of the reaction mixture had recovered to room temperature. The reaction mixture was then placed in an ice/water bath. A solution of 82 g 3,5,5-trimethylhexyl chloride in 100 ml of THF was added to the reaction mixture dropwise over a period of 1.5 hours. After completion of the addition, the reaction mixture was stirred at room temperature overnight under nitrogen.

The reaction mixture was then poured into 600 ml of water and extracted by ethyl acetate (3×300 ml). The organic layers were combined and dried over MgSO$_4$. Evaporation of the organic solvents afforded a crude product which was purified by vacuum distillation. The yield of the product was 90 g (90%).

Proton NMR verified the following structure:

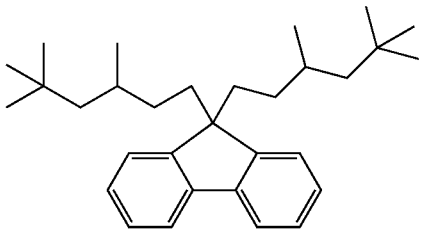

$^1$H-NMR (500 MHz, CDCl$_3$) δ ppm: 7.68 (dd, 2H, J=6 Hz, J=1 Hz fluorene ring), 7.25–7.35 (m, 6H, fluorene ring), 1.90–2.04 (m, 4H, H-alkyl), 1.14–1.22 (m, 2H, H-alkyl), 0.92–0.98 (dd, 2H, H-alkyl), 0.7–0.85 (m, 26H, H-alkyl), 0.5–0.6 (m, 2H, H-alkyl), 0.4–0.5 (m, 2H, H-alkyl).

Example 5

Synthesis of 2,7-dibromo-9,9-bis-(3,5,5-trimethylhexyl)-fluorene

A solution of 70 g 9,9-bis-(3,5,5-trimethylhexyl)-fluorene in 400 ml of chloroform was cooled in an ice/water bath. 67 g of bromine was added to the solution dropwise in the dark. After the addition of bromine, the reaction mixture was stirred for 1 hour, and then was poured into 500 ml of a saturated aqueous solution of sodium carbonate. An additional amount of sodium carbonate was added to the mixture until the organic layer became colorless. The organic layer was then separated and the aqueous layer was extracted by chloroform, two times (2×200 ml). The organic layers were then combined and washed by a 5% solution of sodium hydroxide, then water, and then dried over MgSO$_4$. Evaporation of the solvents afforded a crude product which was further purified by passing it over a short silica gel column using hexane as the eluent. The yield of the product was 83 g (90%)

Proton NMR verified the following structure:

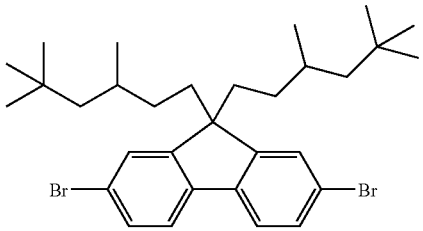

$^1$H-NMR (500 MHz, CDCl$_3$) δ ppm: 7.51 (d, 2H, J=8.5 Hz, fluorene ring), 7.42–7.47 (m, 4H, fluorene ring), 1.8–2.0 (m, 4H, H-alkyl), 1.14–1.24 (m, 2H, H-alkyl), 0.90–0.98 (m, 2H, H-alkyl), 0.7–0.86 (m, 26H, H-alkyl), 0.5–0.6 (m, 2H, alkyl), 0.38–0.48 (m, 2H, H-alkyl).

Example 6

Synthesis of 9,9-bis-(3,5,5-trimethylhexyl)-fluorene-2,7-dicarboxylic acid 3.0 g of magnesium was placed in a 500 ml flask and preheated to 100° C. under dry nitrogen. 5 mg of iodine was added, followed by a first part of a solution (10 ml) of 30 g of 2,7-dibromo-9,9-bis-(3,5,5-trimethylhexyl)-fluorene in 60 ml of dry THF. After the reaction was initialized (as indicated by the disappearance of the color of the solution), the remainder of the solution was added dropwise with a syringe. After the addition, the reaction mixture was refluxed for 1 hour and an additional 100 ml of dry THF was added.

The reaction mixture was then cooled to room temperature and an excess amount of dry ice was added. The flask was shaken until the dry ice was well mixed with the reaction mixture. After the excess amount of dry ice had evaporated, 500 ml of 18% hydrochloric acid was added to the residue. The acidified residue was extracted three times by ethyl acetate (3×200 ml). The organic layers were combined and washed by 400 ml water and then dried over MgSO$_4$. After evaporation of the solvents, 200 ml of hexane was added. The product precipitated as a white solid which was isolated by filtration. Further purification on a silica gel column using ethyl acetate/hexane in a 4:1 ratio as the eluent afforded the product as a white solid. The yield of the product was 11 g (41%).

Proton NMR verified the following structure

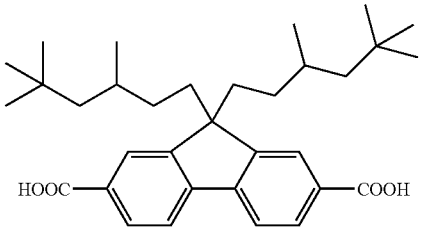

$^1$H-NMR (500 MHz, THF-d$_8$) δ ppm: 8.10 (d, 2H, J=0.5 Hz, fluorene ring), 8.05 (dd, 2H, J=8.5 Hz, J=1.5 Hz, fluorene ring), 7.88 (d, 2H, J=8 Hz, fluorene ring), 2.05–2.2 (m, 4H, H-alkyl), 1.16–1.26 (m, 2H, H-alkyl), 0.94–1.01 (dd, J=14 Hz, J=5 Hz, 2H, H-alkyl), 0.66–0.84 (m, 26H, H-alkyl), 0.50–0.62 (m, 2H, H-alkyl), 0.40–0.50 (m, 2H, H-alkyl).

Example 7

Synthesis of poly(9,9-di-(2-ethylhexyl)-fluorene-oxadiazole)

3.0 g of phosphorus pentoxide was dissolved in 50 ml of methylsulfuric acid with stirring in 110° C. oil heating bath under the protection of nitrogen. A mixture of 2.0 g of 9,9-di-(2-ethylhexyl)-fluorene-2,7-dicarboxylic acid and 286 mg of hydrazine hydrochloride was added to the solution. The suspension was stirred over 5 hours and a homogenous, viscous solution was formed. After the solution had cooled to room temperature, the solution was poured into 500 ml of water. The polymer was precipitated as a white fiber which was isolated by filtration. The crude polymer was washed by an aqueous solution of sodium carbonate, then water, then methanol, and dried at room temperature in vacuo. The crude polymer was dissolved in 25 ml of THF. The solution was filtered through a 5 μm filter, and the polymer was then precipitated from water. The polymer was isolated and washed by water, then methanol, and vacuum dried at room temperature. This purification process was repeated three times and afforded the polymer as a white fiber. The yield of the product was 1.5 g (78%).

Proton NMR verified the following structure:

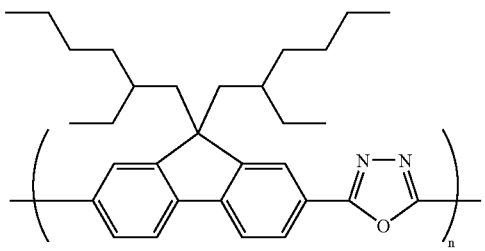

$^1$H-NMR (500 MHz, THF-d$_8$) δ ppm: 8.42 (s, 2H, fluorene ring), 8.26 (d, 2H, fluorene ring), 8.13 (d, J=8 Hz, 2H, fluorene ring), 2.2–2.5 (br, 4H, H-alkyl), 0.8–1.1 (br, 16H, H-alkyl), 0.59–0.65 (br, 14H, H-alkyl).

Example 8

Synthesis of poly(9,9-di-(2-ethylhexyl)-fluorene-oxadiazole)

The experiment of Example 7 was repeated using a different reaction time. In the present Example, the suspension of reaction mixture was stirred for 16 hours. The rest of the procedure for working up and purifying the product was the same as in Example 7. The polymer obtained via the two different procedures (Example 7 and Example 8) exhibited similar performance when used as a material for light emitting diode devices. Proton NMR data were collected, and the results were the same as in Example 7.

Example 9

Synthesis of poly(9,9-di-(2-ethylhexyl)-fluorene-oxadiazole)

The experiment in Example 7 was repeated using a different solvent. In the present Example, Eaton's reagent (obtained from Aldrich) was used as the reaction solvent, and was purified by vacuum distillation before it was used in the reaction. The rest of the procedure was the same as in Example 7. Proton NMR data were collected, and the results were the same as in Example 7.

Example 10

Synthesis of poly(9,9-bis-(3,5,5-trimethylhexyl)-fluorene-oxadiazole)

3.0 g of phosphorus pentoxide was dissolved in 40 ml of methylsulfuric acid by stirring in a 110° C. oil heating bath under the protection of nitrogen. A mixture of 2.0 g of 9,9-bis-(3,5,5-trimethylhexyl)-fluorene-2,7-dicarboxylic acid and 270 mg of hydrazine hydrochloride was added. The suspension was stirred over 5 hours and a homogenous, viscous solution formed. After the solution was cooled to room temperature, the solution was poured into 500 ml of water. Polymer was precipitated as a white fiber and isolated by filtration. The crude polymer was washed by an aqueous solution of sodium carbonate, then water, then methanol, and dried at room temperature in vacuo. The crude polymer was dissolved in 50 ml of THF. The solution was filtered through a 5 μm filter and the polymer was then precipitated from water. The polymer was isolated and washed by water, then methanol, and vacuum dried at room temperature. This purification process was repeated twice and afforded the polymer as a white fiber. The yield of the product was 1.4 g (73%)

Proton NMR verified the following structure

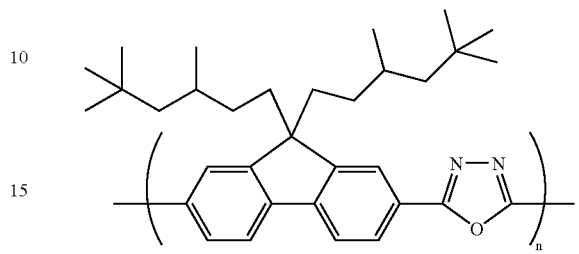

$^1$H-NMR (500 MHz, THF-d$_8$) δ ppm: 8.36 (s, 2H, fluorene ring), 8.25 (broad peak, 2H, fluorene ring), 8.11 (d, 2H, J=8 Hz, fluorene ring), 2.2–2.5 (br, 4H, H-alkyl), 1.26–1.38 (br, 2H, H-alkyl), 1.02–1.10 (br, 2H, H-alkyl), 0.68–0.90(br, 28H, H-alkyl), 0.48–0.66 (br, 2H, H-alkyl).

Example 11

Synthesis of poly(9,9-di-(2-ethylhexyl)-fluorene-oxadiazole-phenylene) as a Random Copolymer To a mixture of 1 g of 9,9-di-(2-ethylhexyl)-fluorene-2,7-dicarboxylic acid, 347 mg of terephthalic acid, and 286 mg of hydrazine hydrochloride was added 50 ml of Eaton's reagent (obtained from Aldrich). The Eaton's reagent was purified by vacuum distillation before it was used in the reaction. The mixture was stirred under nitrogen at 110° C. for 5 hours, after which it was cooled to room temperature and poured into 1000 ml of water. The crude polymer precipitated from water as a white fiber, which was isolated by filtration, washed by water, then methanol, and vacuum dried. The crude polymer was dissolved in 40 ml of thionyl chloride. The solution was filtered through a 5 μm filter, and the solution was poured into 1000 ml of water. White polymer fiber was precipitated and isolated by filtration. The polymer was washed by a large amount of water, then an aqueous solution of sodium carbonate, then water, then methanol, and vacuum dried. The yield of the product was 82%.

Proton NMR verified the following copolymer structure:

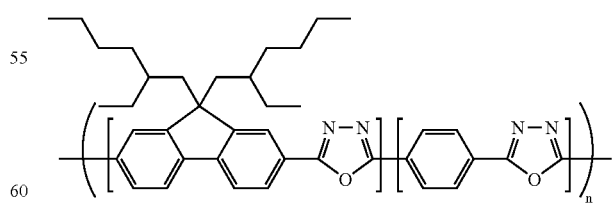

$^1$H-NMR (500 MHz, CDCl$_2$CDCl$_2$) δ ppm: 8.4 (s, 2H, fluorene ring), 8.17–8.31 (d, 2H, fluorene ring, 4H, phenylene ring), 8.01 (d, J=6 Hz, 2H, fluorene ring), 2.10–2.37 (br, 4H, H-alkyl), 0.71–1.1 (br, 16H, H-alkyl), 0.45–0.70 (br, 14H, H-alkyl).

Example 12

Synthesis of poly(9,9-di-(2-ethylhexyl)-fluorene-oxadiazole-phenylene) as a Random Copolymer To a mixture of 1 g 9,9-di-(2-ethylhexyl)-fluorene-2,7-dicarboxylic acid, 173 mg of terephthalic acid, and 214 mg of hydrazine hydrochloride was added 40 ml of Eaton's reagent. The rest of the procedure for working up and purifying the product is the same as in Example 11. The yield of the product was 80%.

Proton NMR verified the following copolymer structure:

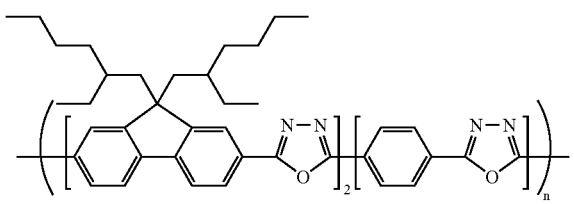

$^1$H-NMR (500 MHz, THF-$d_8$) δ ppm: 8.44 (s, 4H, benzene ring), 8.42 (s, 4H, fluorene ring), 8.26 (d, J=8 Hz, 4H, fluorene ring), 8.13 (d, J=8 Hz, 4H, fluorene ring), 2.25–2.45 (broad peak, 8H, H-alkyl), 0.75–1.1 (br, 32H, H-alkyl), 0.50–0.70 (br, 28H, H-alkyl).

Example 13

Synthesis of poly(9,9-di-(2-ethylhexyl)-fluorene-oxadiazole-phenylene) as a Random Copolymer To a mixture of 1 g 9,9-di-(2-ethylhexyl)-fluorene-2,7-dicarboxylic acid, 226 mg of 2,6-naphthalenedicarboxylic acid and 214 mg of hydrazine hydrochloride was added 50 ml of Eaton's reagent. The mixture was heated under nitrogen at 100° C. for 5 hours. The rest of the procedure for working up and purifying the product was the same as in Example 11. The yield of the product was 85%.

Proton NMR verified the following copolymer structure:

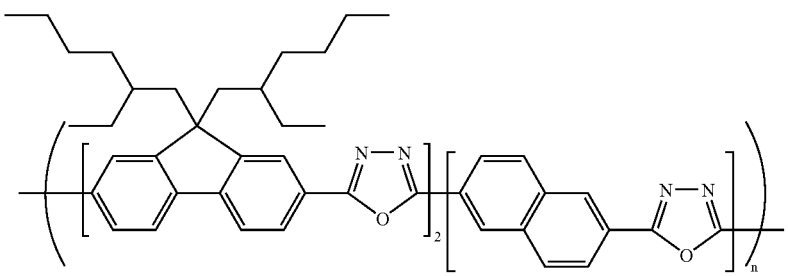

$^1$H-NMR (500 MHz, THF-$d_8$) δ ppm: 8.90 (d, 2H, naphthalene ring), 8.45 (br, 2H, naphthalene ring), 8.42 (br, 4H, fluorene ring), 8.32 (t, J=8 Hz, 2H, naphthalene ring), 8.26 (br, 4H, fluorene ring), 8.13 (br, 4H, fluorene ring), 2.2–2.5 (br, 8H, H-alkyl), 0.75–1.1 (br, 32H, H-alkyl), 0.50–0.70 (br, 28H, H-alkyl).

Example 14

Synthesis of poly(9,9-di-(2-ethylhexyl)-fluorene-oxadiazole-thiophene) as a Random Copolymer To a mixture of 1 g 9,9-di-(2-ethylhexyl)-fluorene-2,7-dicarboxylic acid, 359 mg of thiophene-2,5-dicarboxylic acid and 286 mg of hydrazine hydrochloride was added 50 ml of Eaton's reagent. The mixture was heated under nitrogen at 100° C. for 5 hours. The rest of the procedure for working up and purifying the product was the same as in Example 11. The yield of the product was 80%.

Proton NMR verified the following copolymer structure:

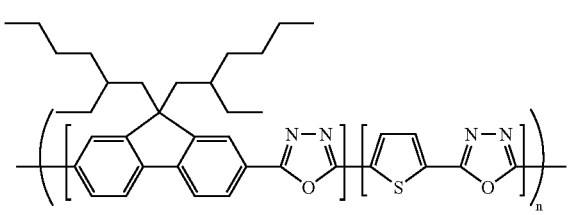

$^1$H-NMR (500 MHz, THF-$d_8$) δ ppm: 8.40 (d, J=9 Hz, 2H, fluorene ring), 8.25 (d, J=8 Hz, 2H, fluorene ring), 8.13 (d, J=5 Hz, 2H, fluorene ring), 8.06 (s, 2H, thiophene ring), 2.32 (br, 4H, —CH2), 0.75–1.1 (broad peak, 16H, H-alkyl), 0.5–0.7 (br, 14H, H-alkyl).

Example 15

Synthesis of 2,5-dihexoxy-terephthalic acid

A mixture of 20 g of diethyl-2,5-dihydroxy terephthalate, 32 g of n-hexyl bromide and 27 g of potassium carbonate in 250 ml DMSO was heated at 100° C. under nitrogen for 20 hours After the mixture was cooled down, it was poured into 500 ml of a 5% aqueous solution of potassium hydroxide and extracted three times by ethyl acetate (3×200 ml). The organic layers were combined and washed by water, then dried over MgSO$_4$. Evaporation of the solvent afforded diethyl-2,5-dihexoxy-terephthalate as a dark-colored crude product.

The crude product without any purification was mixed with 200 ml of ethanol and 20 g of potassium hydroxide. The resulting mixture was refluxed for 2 hours. After the mixture had cooled, 300 ml of 8M hydrochloric acid was added. 2,5-dihexoxy-terephthalic acid precipitated, was isolated by filtration, then washed by, water. Recrystallization from ethyl acetate two times afforded pure 2,5-dihexoxy-terephthalic acid. The yield of the product was 15g (52%)

Proton NMR verified the following structure:

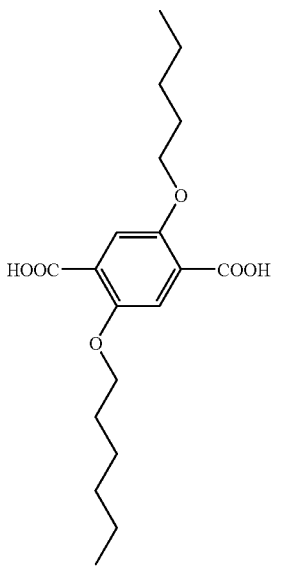

$^1$H-NMR (500 MHz, THF-d8) δ ppm: 11.2 (b, 2H, —COOH), 7.34 (s, 2H, benzene ring), 3.92 (t, J=8 Hz, 4H, O—CH$_2$), 1.65 (m, 4H, H-alkyl), 1.38(m, 4H, H-alkyl), 1.22 (m, 8H, H-alkyl), 0.77(t, J=8 Hz, 6H).

Example 16

Synthesis of 2,5-bis-(3,5,5-trimethylhexoxy)-terephthalic acid

A mixture of 20 g of diethyl-2,5-dihydroxy terephthalate, 30 g of 3,5,5-trimethylhexyl chloride and 27 g of potassium carbonate in 250 ml DMSO was heated at 100° C. under nitrogen for 20 hours. After the mixture cooled down, it was poured into 500 ml of a 5% aqueous solution of sodium hydroxide and extracted three times, by ethyl acetate three times (3×200 ml). The organic layers were combined and washed by water, then dried over MgSO$_4$. Evaporation of the solvent afforded diethyl-2,5-bis-(3,5,5-trimethylhexoxy)-terephthalate as a dark-colored crude product.

The crude product without any purification was mixed with 200 ml of ethanol and 40 g of potassium hydroxide. The resulting mixture was refluxed for 1 hour. After the mixture cooled, 300 ml of 8 M hydrochloric acid was added. 2,5-bis-(3,5,5-trimethylhexoxy)-terephthalic acid precipitated and was isolated by filtration, then washed by water. Purification was done by recrystallization from ethyl acetate/hexane two times, then filtration through a silica gel column using ethyl acetate/hexane=½ as an eluent. The yield of product was 17 g (52%)

Proton NMR verified the following structure:
$^1$H-NMR (400 MHz, CDCl$_3$) δ ppm: 7.88 (s, 2H, benzene ring), 4.31 (t,

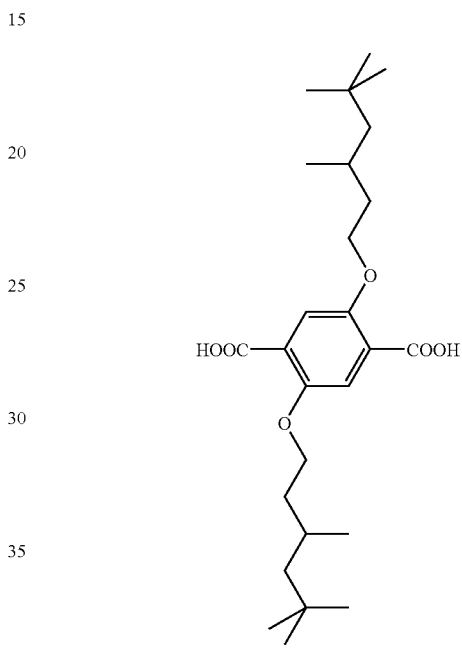

J=7 Hz, 4H, O—CH$_2$), 1.93 (q, J=7 Hz, 2H, H-alkyl), 1.74 (m, 4H, H-alkyl), 1.27 (dd, 2H, J=14 Hz, J=3 Hz, H-alkyl), 1.18 (dd, J=11 Hz, J=6 Hz, 2H, H-alkyl), 1.03 (s, 6H, H-alkyl), 1.02 (s, 6H, H-alkyl), 0.91 (s, 18H, H-alkyl).

Example 17

Synthesis of poly(2,5-dihexoxyphenylene-oxadiazole)

To a mixture of 1.0 g of 2,5-dihexoxy-terephthalic acid and 187 mg of hydrazine hydrochloride was added 10 ml of Eaton's reagent. The mixture was stirred at 65° C. under nitrogen. After 30 minutes, 10 ml of additional Eaton's reagent was added. The mixture was stirred for 3 hours before it was cooled down to room temperature and poured into 500 ml water. The polymer precipitated and was isolated by filtration. The crude polymer was washed by water and methanol alternately until neutral, then dried in vacuo.

The dried crude polymer was heated with 40 ml of SOCl$_2$ for 0.5 hour. The homogenous solution was passed through a 5 μm filter and then precipitated from 500 ml water. The solid was isolated by filtration and washed by water and methanol alternately until neutral. The polymer was dried in vacuo.

Proton NMR verified the following structure:

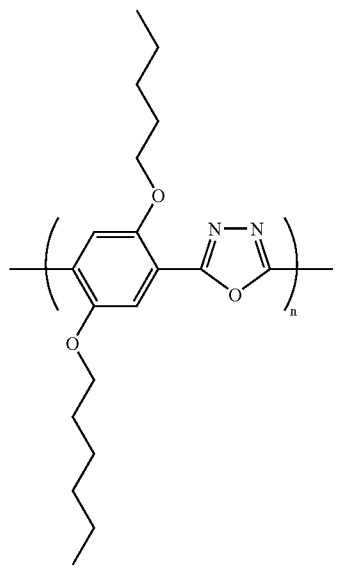

$^1$H-NMR (500 MHz, CDCl$_3$) δ ppm: 7.65–7.90 (br, 2H, benzene ring), 4.18 (br, 4H, O—CH$_2$), 1.89 (br, 4H, H-alkyl), 1.48 (br, 4H, H-alkyl), 1.29 (br, 8H, H-alkyl), 0.84 (t, J=8 Hz, 6H).

Example 18

Synthesis of poly(2,5-bis(3,5,5-trimethylhexoxy)-phenylene-oxadiazole)

To a mixture of 1.8 g P$_2$O$_5$ and 30 ml of CH$_3$SO$_3$H preheated to 60° C. was added a mixture of 1.5 g of 2,5-bis(3,5,5-trimethylhexoxy)-terephthalic acid and 228 mg of hydrazine hydrochloride. The mixture was stirred at 60° C. under nitrogen for 20 hours. After the mixture cooled down to room temperature, it was poured into 500 ml water. The polymer precipitated and was isolated by filtration. The crude polymer was washed by water and methanol alternately until neutral, then dried in vacuo.

The dried crude polymer was heated with 40 ml of SOCl$_2$ for 0.5 hour. The homogenous solution was passed through a 5 μm filter and then precipitated from 500 ml water. The solid was isolated by filtration and washed by water and methanol alternately until neutral. The polymer was dried in vacuo.

Proton NMR verified the following structure:

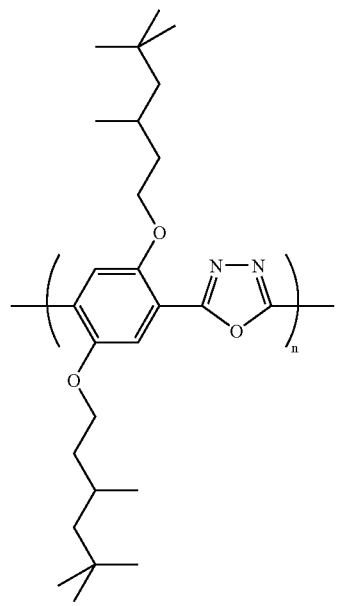

$^1$H-NMR (400 MHz, CDCl$_3$) δ ppm: 7.76 (br, 2H, benzene ring), 4.20 (br, 4H, O—CH$_2$), 1.90 (br, 2H, H-alkyl), 1.74 (br, 4H, H-alkyl), 1.26 (br, 2H, H-alkyl), 1.1 (br, 2H, H-alkyl), 0.90–1.02 (br, 12H, H-alkyl), 0.81 (br, 18H, H-alkyl).

Example 19

The polymer disclosed in Example 7 was dissolved in toluene to produce a solution with a polymer concentration of 8 mg/ml. Solutions with concentrations of 1 mg/ml to 15 mg/ml were also prepared. The solutions were stirred with a magnetic bar at room temperature for several hours. A clean, colorless solutions were formed. Pinhole-free, uniform films were obtained by spin-casting the solutions at room temperature. The spin speed was in the range of 400 rpm to 5000 rpm. High quality films with thicknesses of 300 Å to 5000 Å were obtained by varying the spin speed and the solution concentration. Films with thicknesses from 0.03–20 μm were also prepared by dip-casting or drop-casting over large areas.

Spectral measurements were carried out on these films. FIG. 1a shows the absorption and photoluminescence (PL) spectra from a film of the polymer synthesized in Example 7. The onset of the absorption band is at approximately 400 nm. The PL emission profile is characterized by several vibronic side bands in the blue region (400 to 500 nm) with a tail extending to longer wavelengths. The emission color is saturated blue with CIE coordinates x=0.19, y=0.16, close to the blue color coordinates that the CIE recommends for color displays.

The PL efficiency of these films was measured with a UV lamp at 365 nm and a calibrated integrating sphere detector. The PL efficiency was 13–20% in films and 40–65% in THF solution.

Figure 1B:
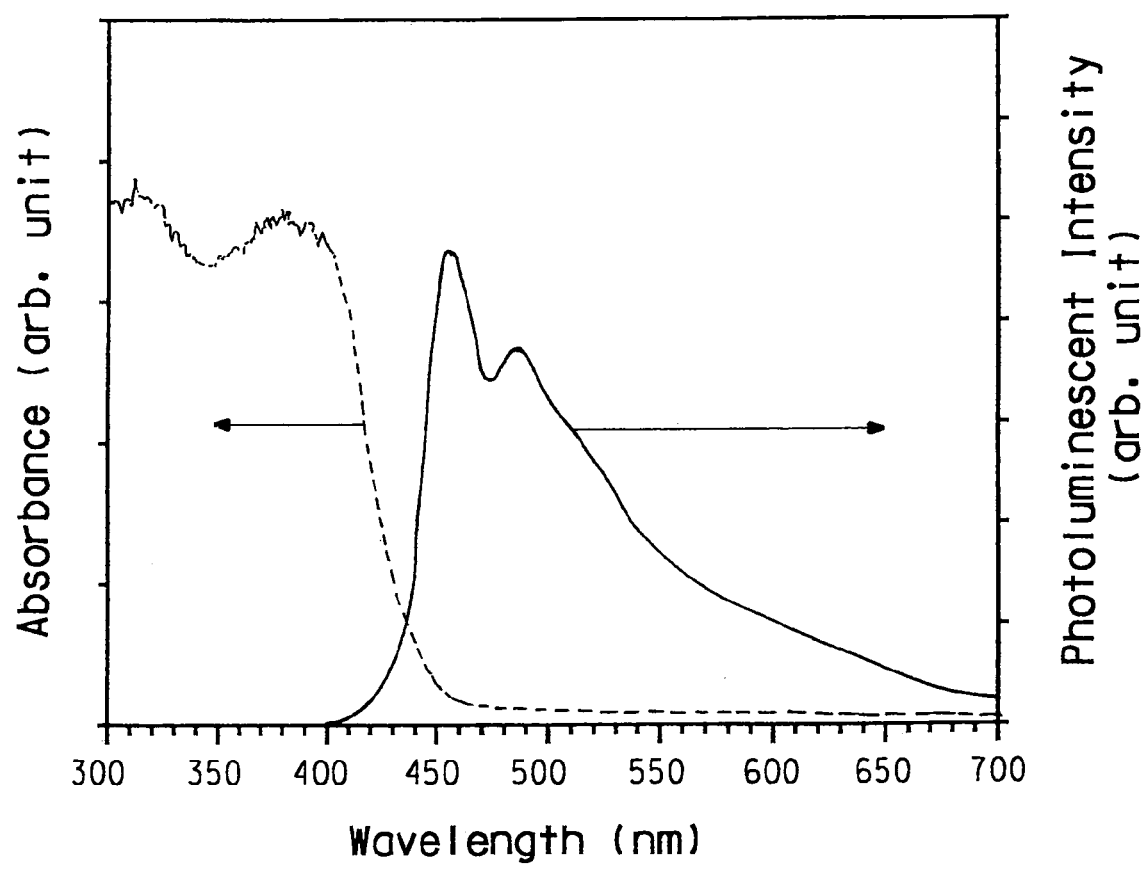

FIG. 1b shows the absorption and photoluminescence (PL) spectra from a film of the polymer synthesized in Example 18.

Example 20

Polymer solutions were prepared and films were spin-cast as disclosed in Example 19, but with the materials described in Examples 8–14, 17–18. Polymer films were cast following procedures similar to those described in Example 19. Luminescence in different colors and in broad band white emission were observed for the,;.different polymers. When PL efficiencies were measured, the results ranged from 10–30% for the thin solid film and 30–60% for the solution in THF. The data are summarized in the following Table.

TABLE

| Polymer in Example | PL peak λ (nm) | PL Efficiency | |
|---|---|---|---|
| | | $\eta_{solution}$ | $\eta_{film}$ |
| 8 | 432 | 49% | 13% |
| 9 | 432 | 49% | 13% |
| 10 | 430 | 36% | 8% |
| 11 | 430 | 47% | 15% |
| 12 | 430 | 39% | 11% |
| 13 | 430 | 47% | 16% |
| 14 | 500 | 61% | 30% |
| 17 | 454 | 10% | — |
| 18 | 455 | 10% | — |

Example 21

Thin film devices were fabricated in a sandwich configuration with layers in the following order: anode/poly(fluorene-oxadiazole)/cathode. ITO on a glass substrate was used as the transparent anode. For some devices, an ITO/PEDOT bilayer electrode was used as the transparent anode. PEDOT is a transparent, conductive polymer film with bulk resistivity on the order of 1 Ωcm. The poly(fluorene-oxadiazole) material used in the present Example was that described in Example 7. Calcium was used as the cathode electrode. The thickness of the polymer layer was approximately 100 nm. The active area was approximately 0.15 cm², which was defined by the overlap area of the two electrodes.

The current-voltage ("I–V") characteristic of the device is indicative of rectification, with a larger current observed when biased in the forward direction (higher potential applied to anode). The rectification ratio (i.e., the ratio of forward current to reverse current at a given voltage) was typically larger than $10^2$. Similar results were observed in devices made with the polymers disclosed in Examples 8–14.

Au, Ag, Ni, Cu, Se, and PANI were also used as the anode electrodes, yielding similar results. Ba, Li, Ce, Cs, Eu, Rb, Sm Al, and In were also used as the cathode electrode, and similar I–V characteristics were observed.

Example 22

Figure 2:
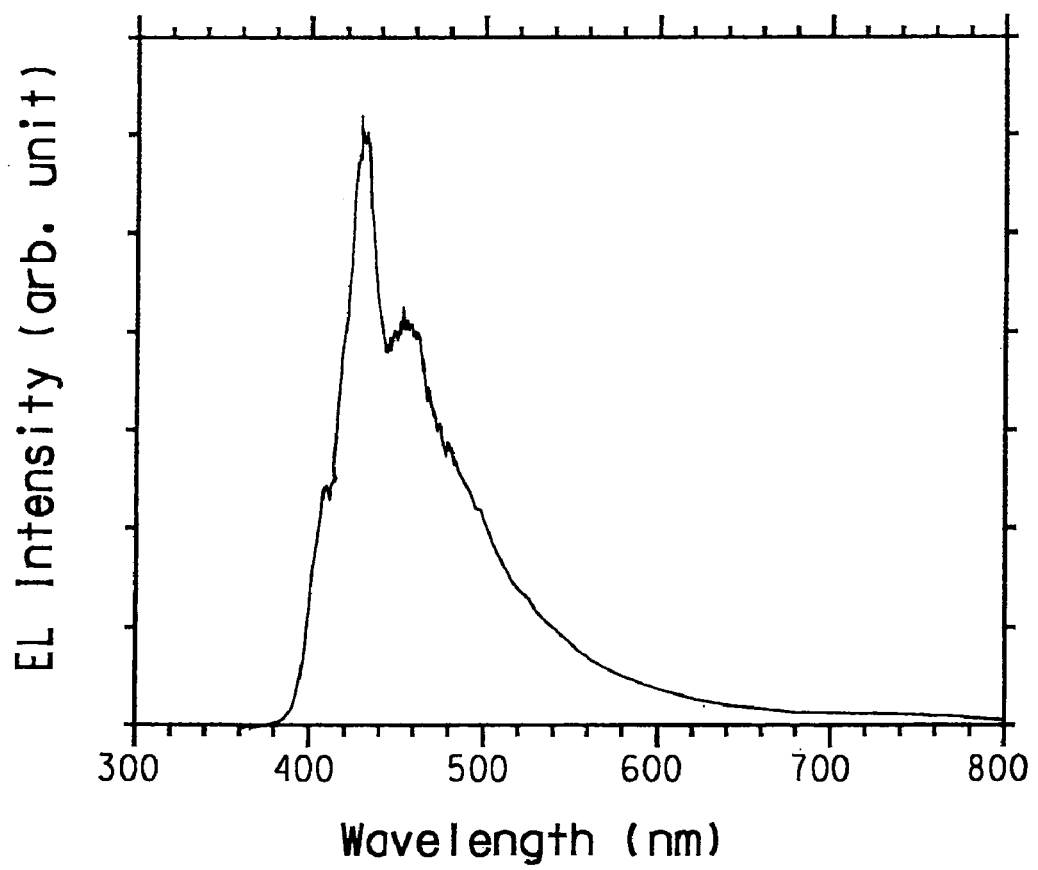
FIG. 2 Electroluminescence emission of a polymer light emitting device made of poly(fluorene-oxadiazole) from Example 7.
Figure 3A:
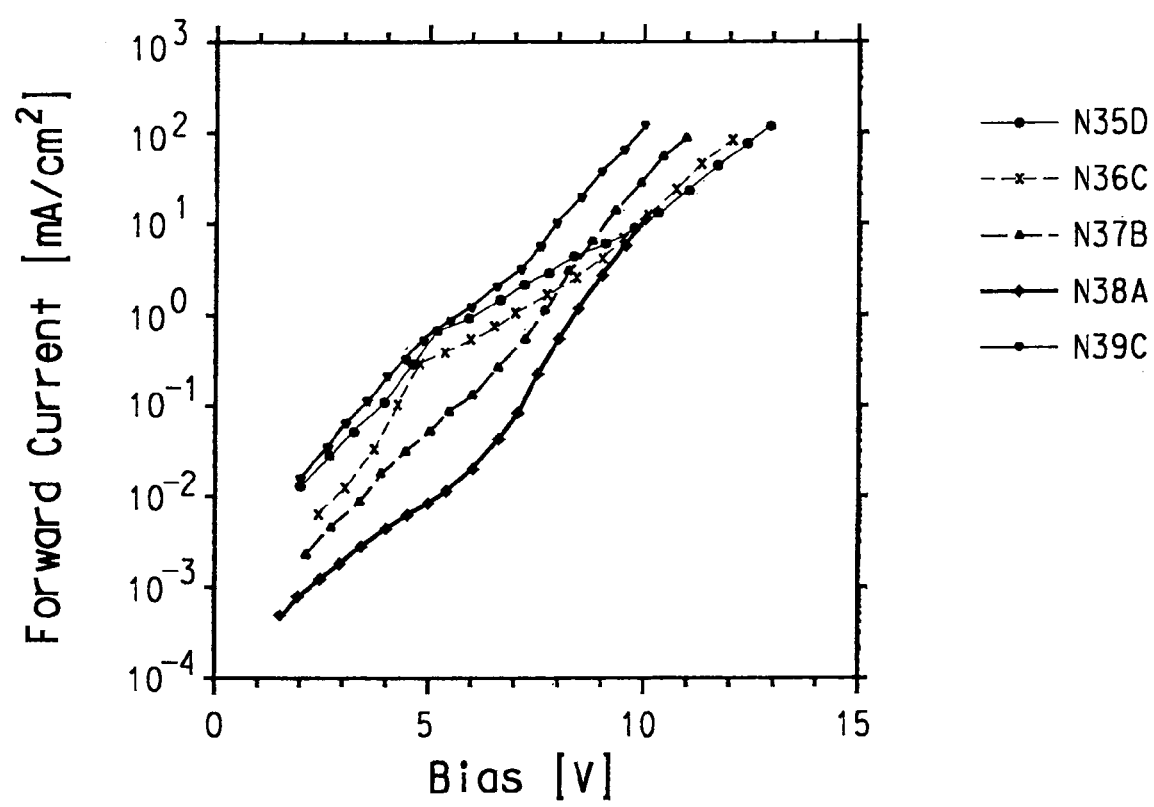
FIG. 3(a) Current-Voltage dependence for a set of light emitting devices with different thickness; (b) Luminance-Voltage dependence for a set of light emitting devices with different thickness; (c) External quantum efficiency as a function of drive current for a set of light emitting devices with different thickness.
Figure 3B:
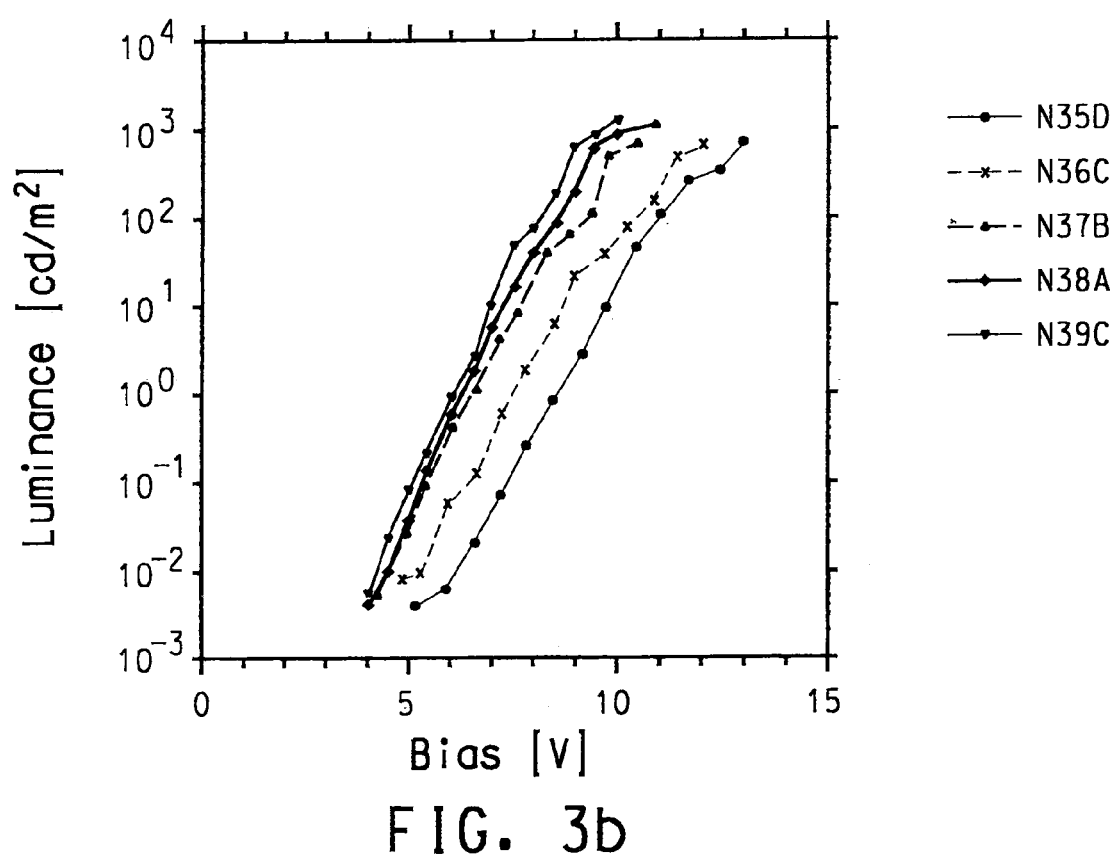
Figure 3C:
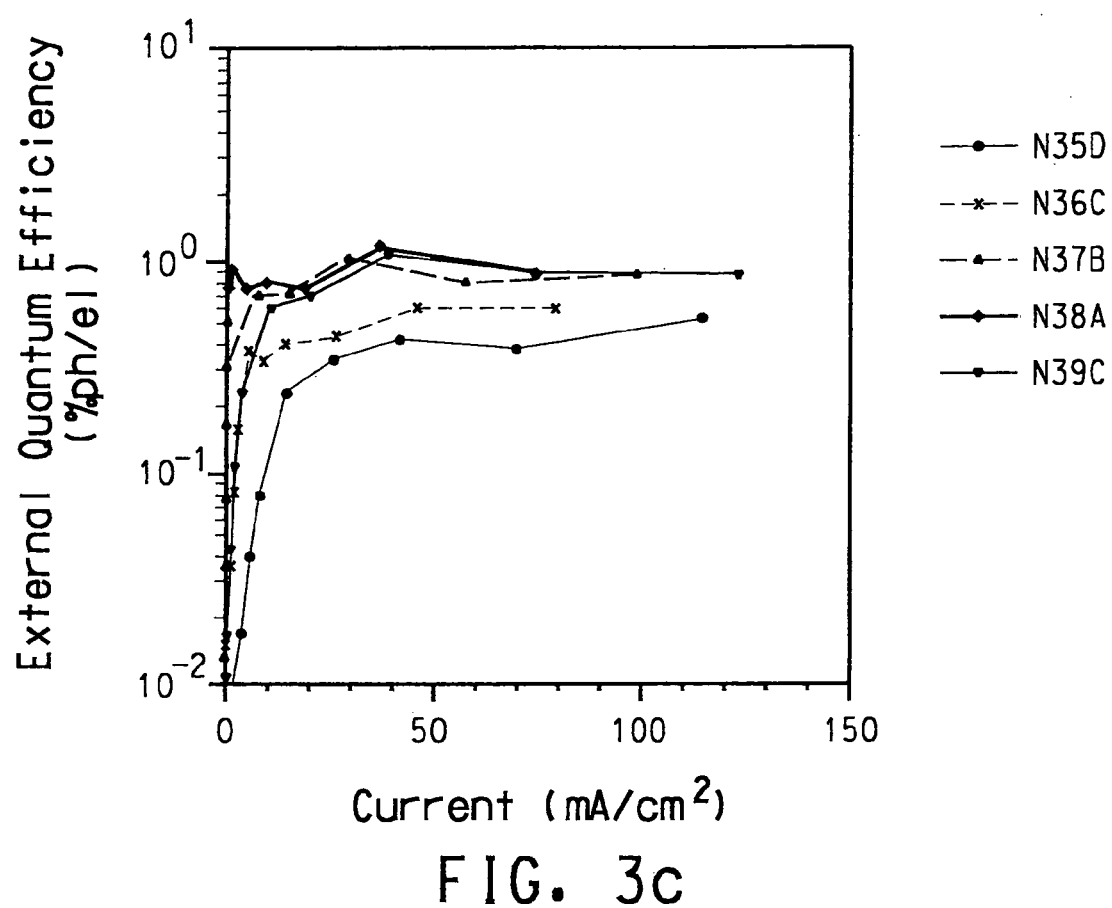

Light emitting devices were fabricated using the poly (fluorene-oxadiazole) disclosed in Example 7. These devices have the following layered structure: ITO/PEDOT(80 nm)/PVK(30 nm)/poly(fluorene-oxadiazole) (100 nm)/Ba(5 nm)/Al(100 nm). The numbers in the brackets indicate the nominal thickness of the corresponding layers. A thin PVK layer was inserted between the PEDOT and poly(fluorene-oxadiazole) layers to improve the hole injection into the polymer and to effectively block the electrons from coming out of the poly(fluorene-oxadiazole) layer. Blue light emission with an external quantum efficiency over 1% ph/el was obtained. FIG. 2 shows the electroluminescent emission from such a device. The CIE color coordinates are x=0.18, y=0.15, which are close to the numbers recommended by the CIE for color display applications. FIG. 3 provides a summary of data from devices with different thicknesses ranging from 600 Å to 1000 Å. Data include I–V characteristics, emission-voltage (L-V) dependence, and the EQE as a function of the driving current. The data indicate that high efficiency blue LEDs can be fabricated using the polymer disclosed in Example 7. The external quantum efficiency remained approximately 1% ph/el over a broad current range, which is rarely seen in polymer LEDs with blue color. These devices were operated at low bias voltage. Light emission was typically observed above 4 V, reaches approximately 100 cd/m² at approximately 8 V, and reaches over $10^3$ cd/m² at 10V. These numbers are among the best demonstrated for blue polymer LEDs.

Example 23

Figure 4:
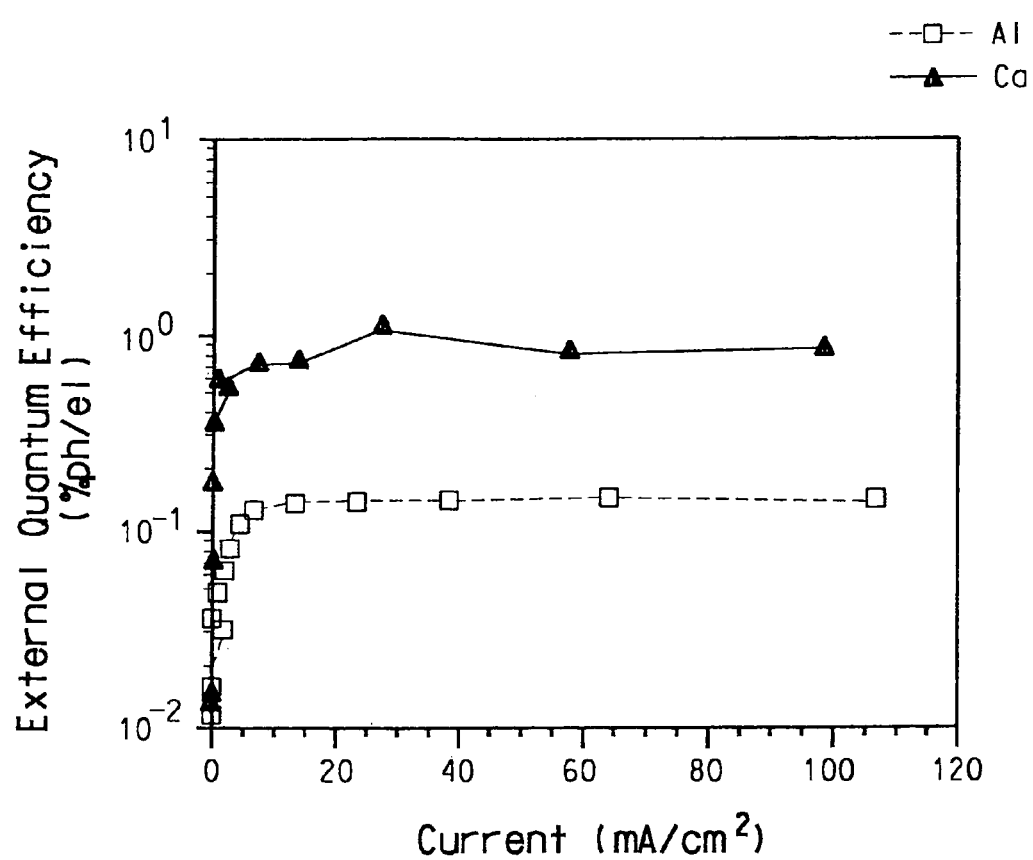
FIG. 4 External quantum efficiency as a function of drive current for poly(fluorene-oxadiazole) light emitting devices fabricated with Ca as the cathode and with Al as the cathode.

Polymer LEDs were also fabricated with the polymer disclosed in Example 7. The device structure was as follows: glass/ITO/PEDOT(80 nm)/PVK(30 nm)/Poly(fluorene-oxadiazole)(100 nm)/cathode. Several metals were used as the cathode material, including Ba, Sm, Ca, Y, In and Al. FIG. 4 compares the EQE as a function of the drive current in Ca and Al devices. The work functions of these two metals are 2.9 eV and 4.2 eV, respectively. Relatively high EQE (0.15–0.2% ph/el) was observed in the device made with Al as the cathode. The ratio of EQE between the Ca devices and the Al devices is approximately 5 for the data shown in FIG. 4, in contrast to the ratio of $10^2$–$10^3$ typically seen in devices made of other blue polymers synthesized using different methods.

Example 24

Devices were fabricated with a structure similar to that disclosed in Example 23. A thin compound buffer layer of BaO (as disclosed in U.S. Ser. No. 09/173,157) was introduced between the poly(fluorene-oxadiazole) and the cathode metal contact. Organic compounds, e.g., anionic surfactants, were also used as the thin buffer layer. The ether sulfate anionic surfactants had the following common structure:

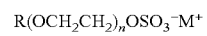

$$R(OCH_2CH_2)_nOSO_3^-M^+$$

wherein each R represents alkyl or alkylaryl, $M^+$ represents a proton, metal or ammonium counterion, and n represents moles of ethylene oxide, typically n=2–40. Use of such anionic surfactants as additives for improving the performance of polymer light-emitting diodes is disclosed in U.S. Ser. No. 08/888,316.

By introducing the thin buffer layer (typical thickness in range of 0.3–10 nm) between the poly(fluorene-oxadiazole) and an air stable metal cathode with work function over 4 eV (such as Al), the operating voltage was reduced and the emission efficiency was improved to a level similar to that of the corresponding alkaline earth metal.

Example 25

The anionic surfactants used in Example 24 were blended with the poly(fluorene-oxadiazole) from Example 7 in a 1:5 weight ratio of surfactant to polymer. Light emitting devices were fabricated in the following form: ITO/PEDOT(80 nm)/PVK(30 nm)/poly(fluorene-oxadiazole) blend(100 nm)/Al. The external quantum efficiency was approximately 0.8% ph/el, similar to that observed in devices made with a Ca cathode.

Example 26

Two light emitting devices were fabricated in the form of:
(a) ITO/PEDOT(80 nm)/poly(fluorene-oxadiazole)(100 nm)/Ba(3 nm)/Al(100 nm);
(b) ITO/PVK(30 nm)/poly(fluorene-oxadiazole)(100 nm)/Ba(3 nm)/Al(100 nm).

Figure 5:
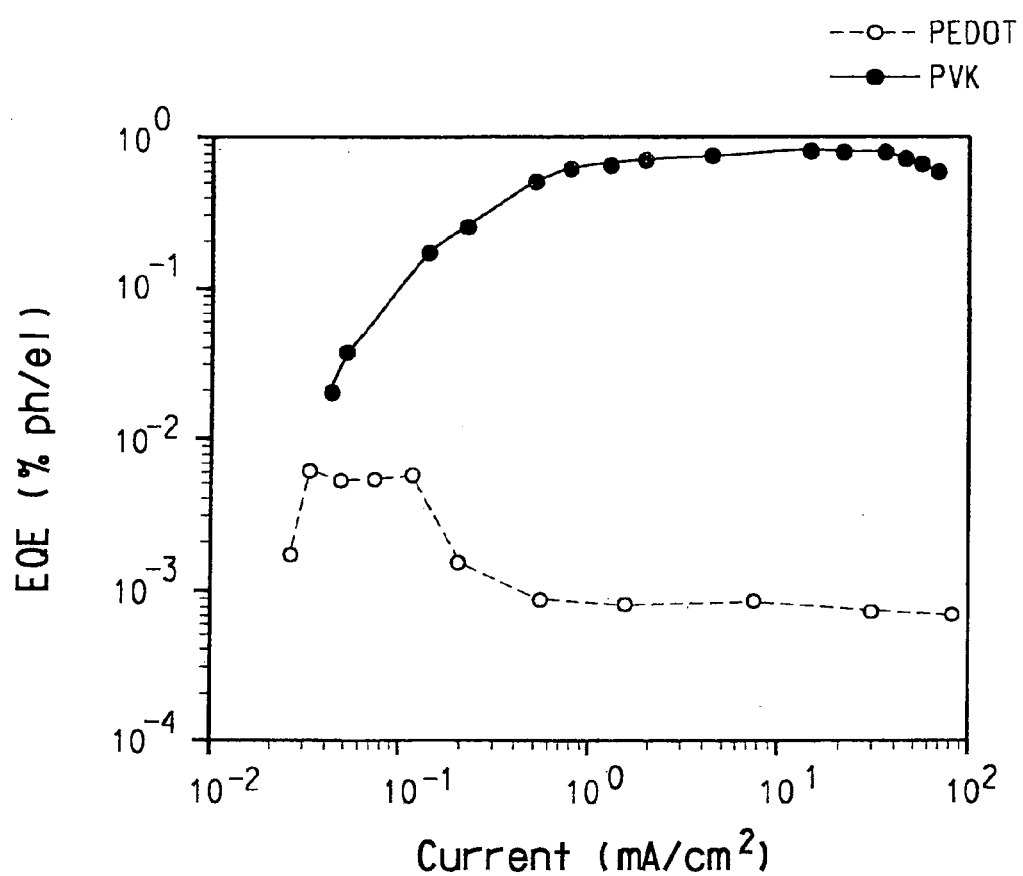
FIG. 5 External quantum efficiency as a function of drive current for poly(fluorene-oxadiazole) light emitting devices with Ba/Al cathode and with polyvinylcarbazole and poly(ethylenedioxythiophene) buffer layers between the electroluminescent polymer and the indium-tin-oxide anode.

The difference between the two devices is the buffer layer, either PEDOT or PVK, between the ITO contact and the luminescent poly(fluorene-oxadiazole) layer. The effective work function of the PEDOT layer is approximately 5.2 eV, and that of PVK is approximately 5.5 eV. The device EL efficiency as function of driving -current is compared in FIG. 5. The EL efficiency in device (b) is close to 1% ph/el, approximately $10^3$ times higher than that in device (a).

Example 27

Figure 6:
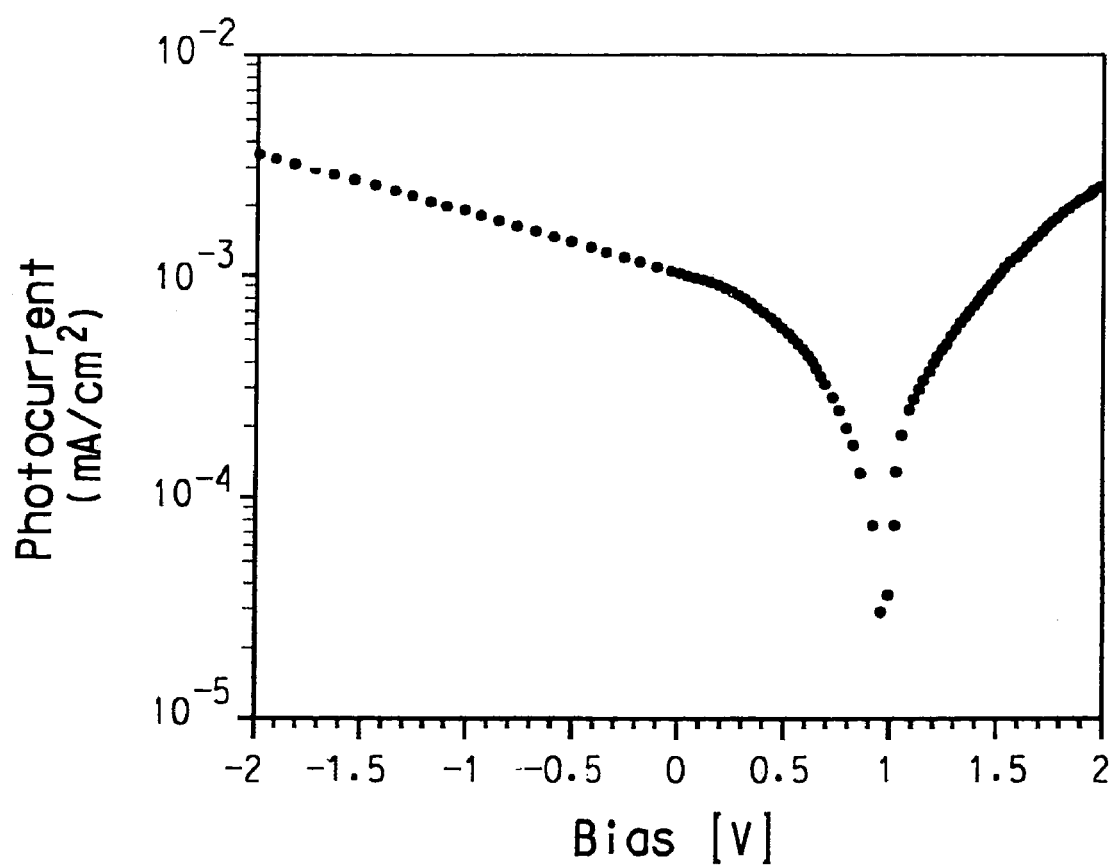
FIG. 6 Photocurrent as a function of bias voltage in a device comprising poly(fluorene-oxadiazole) from Example 7.

Thin film devices were fabricated in the following configuration: ITO/PEDOT(80 nm)/poly(fluorene-oxadiazole) (100 nm)/Ba(3 nm)/Al(100 nm). The current voltage characteristic under white lamp illumination was measured. The results are shown in FIG. 6, wherein the magnitude of the photocurrent is plotted as a function of biasing voltage. The short circuit current at zero bias is approximately 1.5 $\mu A/cm^2$. The intensity of the radiation in the UV spectral region (within the absorption band of the polymer) is about 200 $\mu W/cm^2$. The photosensitivity of the device is thus approximately 7.5 mA/Watt. The photosensitivity improves under reverse bias to 24 mA/Watt at -2 V bias.

The open circuit voltage (as indicated by the minimum point in FIG. 6) is approximately 1.0 V. It is much smaller than that observed in devices made with polyparaphenylene vinylene ("PPV") derivatives (G. Yu et al., *Appl. Phys. Lett.* 68, 1540 (1994)), suggesting that the lowest unoccupied molecular orbital ("LUMO") of poly(fluorene-oxadiazole) from Example 7 is much lower than the work function of Ba (2.5 eV). Since in this Example the open circuit voltage is determined by the energy difference between the LUMO of the polymer and the work function of the ITO (approximately 4.5–47 eV), the LUMO of poly(fluorene-oxadiazole) can be inferred to be approximately 3.5 eV, much lower than poly(fluorene)s synthesized via other routes (U.S. Pat. No. 5,777,070 and U.S. Pat. No. 5,708,130). Combining the LUMO energy inferred from this Example and the highest occupied molecular orbital ("HOMO") energy obtained from Example 26, the electronic structure of the polymer is inferred as the following: the HOMO is in the vicinity of approximately 6±0.5 eV and the LUMO is in the vicinity of 3.5±0.5 eV. These values are consistent with the optical band gap shown in FIG. 1, Example 28

Figure 7:
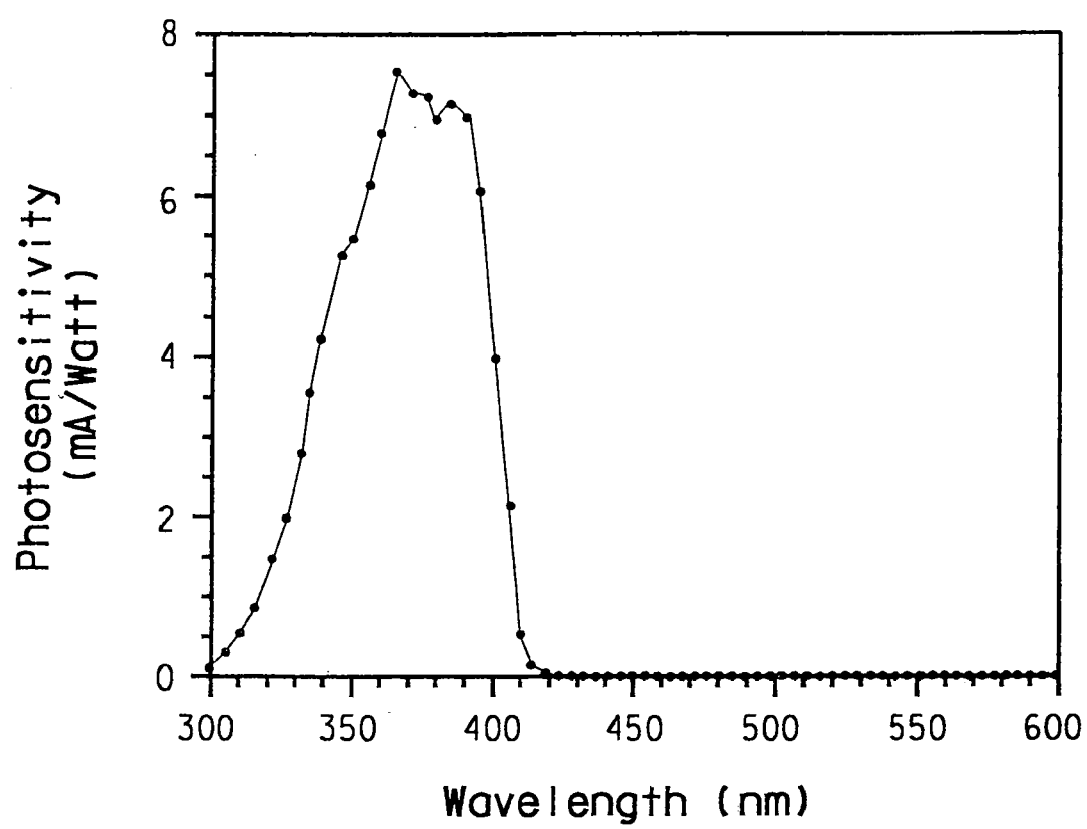
FIG. 7 Photosensitivity as a function of wavelength in a photodiode made with a poly(fluorene-oxadiazole) film.

By selecting a poly(fluorene-oxadiazole) with an absorption edge at 400 nm or shorter, visible-blind UV detectors can be obtained. FIG. 7 shows the spectral response of a photodetector made with such a material. The data were taken under zero bias, i.e., in the photovoltaic mode. The device was constructed with a structure similar to that of Example 27.

The onset of the photoconductive response is at approximately 400 nm, similar to that of the absorption spectrum in the same material. Such a device can be used for visible-blind UV detection. The ratio of the photoresponse at 380 nm to that at 450 nm is larger than $1:10^4$.

Example 29

A light-emitting device was prepared as follows. On partially patterned ITO was spun a suspension of polyethylene dioxythiophene ("PEDOT") in water at 1,000 rpm for 120 seconds. The layer was dried under vacuum at 85° C. for 15 hours, and the resulting film thickness was 600 Å. Under an inert atmosphere, a 300 Å layer of PVK was laid down on top of the passivation layer by spinning a 1% wt./vol. solution of PVK in 1,1,2,2-tetrachloroethane at 5,000 rpm for 60 seconds. (PVK is commercially available from Aldrich, and was used as received). After drying at 60° C. for 1 hour, a 600 Å layer of the polymer in Example 7 was laid down from a 8 mg/ml solution. A layer of tris(benzoylacetonato)(monophenanthroline)europium(II) (80:20 ratio by wt.) was spin-cast on top of the PVK layer at 5,300 rpm for 60 seconds. The layer was dried under vacuum at ambient temperature for 1 hour. A dual-layer cathode was deposited as described in U.S. Ser. No. 08/872,657.

Figure 8:
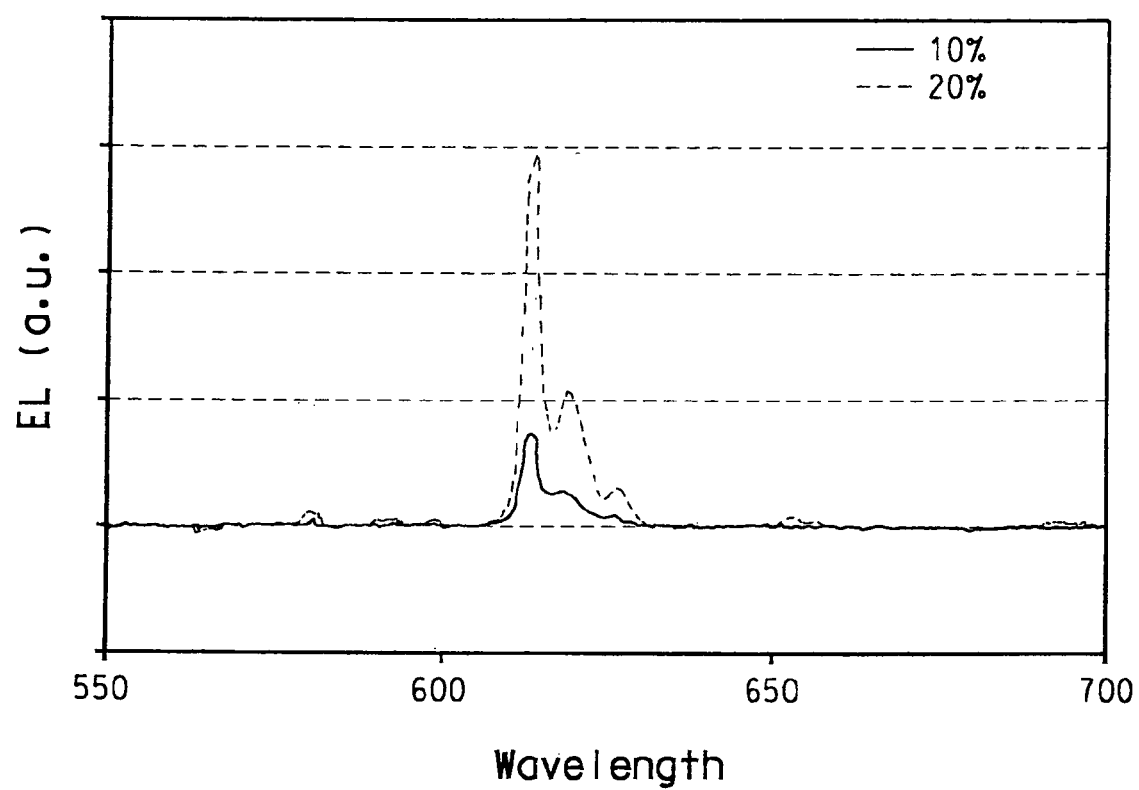
FIG. 8 Electroluminescence spectra from devices made according to the procedure described in Example 29.

FIG. 8 shows the electroluminescence spectra of the resulting devices (10 and 20% by wt. of the Eu(II):complex). Note that no blue emission is observed from the europium ion, only red emission at 613 nm.

The above description and examples disclose several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method for preparing an electroluminescent device, said method comprising:
   (i) providing a conjugated polymer comprising at least about 20 repeat units, which may independently be the same or different, the repeat units represented by formula:

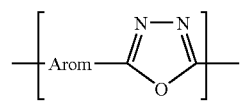

wherein Arom is a moiety selected from Formulae (1) and (2):

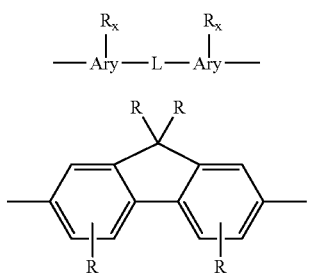

(1)

(2)

wherein each Ary, which may independently be the same or different, is selected from an aromatic hydrocarbon ring and a $C_{2+}$ aromatic heterocyclic ring, wherein the aromatic hydrocarbon ring is selected from fluorenyl, terphenyl, tetraphenyl, pyrenyl, and phenanthryl, and the $C_{2+}$ heterocyclic ring is selected from pyrrolyl, furanyl, imidazolyl, triazolyl, isoxazolyl, oxadiazolyl, furazanyl, pyridazinyl, pyrimidyl, pyrazinyl, triazinyl, tetrazinyl, benzofuranyl, benzothiophenyl, indolyl, isoindazolyl, benzimidazolyl, benzotriazolyl, benzoxazolyl, quinolyl, isoquinolyl, cinnolyl, quinazolyl, naphthyridyl, phthalazyl, phentriazyl, benzotetrazyl, carbazolyl, dibenzofuranyl, dibenzothiophenyl, acridyl, and phenazyl;

wherein L is selected from an ethynyl group and a substituted or unsubstituted ethenyl group;

wherein each R, which may independently be the same or different and which may be unsubstituted or substituted by a substituent selected from cyano, nitro, and halogen, is selected from the group consisting of hydrogen, aryl, alkylaryl, arylalkyl, and alkyl, wherein none or one or more —CH$_2$— units of the alkyl are replaced by a moiety selected from —O—, —S—, $C_{2-14}$ aryl, and —NR'— wherein each R', which may independently be the same or different, comprises a $C_{1-100}$ saturated acyclic hydrocarbyl group; and wherein each x is the number of hydrogen atoms of Ary capable of substitution by R;

(ii) preparing a solution of the polymer in an organic solvent; and (iii) casting the solution onto a substrate, thereby forming a polymer layer on the substrate.

2. The method of claim 1, wherein said organic solvent is selected from the group consisting of tetrahydrofuran, toluene, xylene, tetrachloroethane, and mixtures thereof.

3. The method of claim 1, wherein said dissolving step comprises adding the polymer to the solvent, stirring the mixture until a clear solution is formed, and filtering the solution.

4. The method of claim 1, wherein said dissolving step is conducted at about room temperature.

5. The method of claim 1, wherein said casting step comprises a casting method selected from the group consisting of spin-casting, dip-casting, drop-casting, film-casting, and ink jet printing.

6. The method of claim 1, wherein said casting step comprises spin casting polymer solution onto the substrate at a cast speed in the range of about 400 rpm to about 5,000 rpm.

7. The method of claim 1, wherein the polymer layer ranges in thickness from about 300 Å to about 5,000 Å.

8. A device made by the method of claim 1.

* * * * *